US012100358B2

(12) United States Patent
Kawamorita et al.

(10) Patent No.: US 12,100,358 B2
(45) Date of Patent: Sep. 24, 2024

(54) SCANNING SIGNAL LINE DRIVE CIRCUIT AND DISPLAY DEVICE PROVIDED WITH SAME

(71) Applicant: Sharp Display Technology Corporation, Mie (JP)

(72) Inventors: Seiya Kawamorita, Kameyama (JP); Satoshi Horiuchi, Kameyama (JP); Yasuaki Iwase, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/504,299

(22) Filed: Nov. 8, 2023

(65) Prior Publication Data

US 2024/0194151 A1 Jun. 13, 2024

(30) Foreign Application Priority Data

Dec. 12, 2022 (JP) ................................ 2022-197773

(51) Int. Cl.

*G09G 3/20* (2006.01)
*G09G 3/3266* (2016.01)
*G11C 19/28* (2006.01)

(52) U.S. Cl.

CPC ... *G09G 3/3266* (2013.01); *G09G 2300/0426* (2013.01); *G09G 2310/0286* (2013.01); *G09G 2310/08* (2013.01)

(58) Field of Classification Search

CPC ......... G09G 3/3266; G09G 2300/0426; G09G 2310/0286; G09G 2310/08

See application file for complete search history.

(56) References Cited

U.S. PATENT DOCUMENTS

| | | | |
|---|---|---|---|
| 2010/0231497 A1 | 9/2010 | Liao et al. | |
| 2010/0277206 A1 | 11/2010 | Lee et al. | |
| 2013/0181747 A1 | 7/2013 | Yoon et al. | |
| 2014/0078124 A1 | 3/2014 | Chen | |
| 2019/0073973 A1 | 3/2019 | Horiuchi et al. | |
| 2021/0335202 A1* | 10/2021 | Feng ...................... | G11C 19/28 |

FOREIGN PATENT DOCUMENTS

| | | |
|---|---|---|
| JP | 2010-218673 A | 9/2010 |
| JP | 2010-262296 A | 11/2010 |
| JP | 2013-142899 A | 7/2013 |
| JP | 2014-063164 A | 4/2014 |
| JP | 2019-045673 A | 3/2019 |

* cited by examiner

*Primary Examiner* — Deeprose Subedi

(74) *Attorney, Agent, or Firm* — ScienBiziP, P.C.

(57) ABSTRACT

A unit circuit constituting each of stages of a shift register is provided with a thin film transistor, the thin film transistor including a control terminal applied with one of a plurality of gate clock signals, a first conduction terminal connected to a third node, and a second conduction terminal applied with a direct current power supply voltage of a low level. The third node is connected to a control terminal of a thin film transistor configured to change a potential of a second node toward a high level. When a gate clock signal applied to a control terminal of a thin film transistor configured to change a potential of the third node toward the high level changes from the high level to the low level, the gate clock signal applied to the control terminal of the thin film transistor changes from the low level to the high level.

19 Claims, 22 Drawing Sheets

SCANNING SIGNAL LINE DRIVE CIRCUIT AND DISPLAY DEVICE PROVIDED WITH SAME

CROSS-REFERENCE TO RELATED APPLICATIONS

This application claims the benefit of priority to Japanese Patent Application Number 2022-197773 filed on Dec. 12, 2022. The entire contents of the above-identified application are hereby incorporated by reference.

BACKGROUND

Technical Field

The following disclosure relates to a display device and particularly relates to a scanning signal line drive circuit provided with a shift register that drives scanning signal lines disposed on a display portion of the display device.

A liquid crystal display device that includes a display portion including a plurality of source bus lines (image signal lines) and a plurality of gate bus lines (scanning signal lines) has been known. In such a liquid crystal display device, a pixel forming section that forms a pixel is provided at each of intersections of the source bus lines and the gate bus lines. Each pixel forming section includes a thin film transistor (TFT) serving as a switching element, in which a gate terminal is connected to a gate bus line passing through a corresponding intersection and a source terminal is connected to a source bus line passing through the corresponding intersection, a pixel capacitance configured to hold a pixel voltage value, and the like. The liquid crystal display device also includes a gate driver (a scanning signal line drive circuit) for driving the gate bus lines and a source driver (an image signal line drive circuit) for driving the source bus lines.

An image signal indicating the pixel voltage value is transmitted through the source bus lines. However, each of the source bus lines cannot transmit image signals indicating the pixel voltage values for a plurality of rows at one time (at the same time). Thus, the image signals are sequentially written (charged) into the pixel capacitances in the plurality of pixel forming sections provided in the display portion on a row-by-row basis. In order to achieve this writing scheme, the gate driver is constituted by a shift register including a plurality of stages so as to sequentially select the plurality of gate bus lines for a predetermined period each time. Then, active scanning signals are sequentially output from the plurality of stages to cause the image signals to be sequentially written into the pixel capacitances on the row-by-row basis as described above.

Incidentally, the gate driver has been mounted as an integrated circuit (IC) chip on a peripheral portion of a substrate constituting a liquid crystal panel in many cases. However, in recent years, the gate driver is often formed directly on the substrate. Such a gate driver is referred to as a "monolithic gate driver".

Note that, hereinafter, a circuit constituting each of the stages of the shift register in the gate driver is referred to as a "unit circuit". With respect to an n-channel thin film transistor, of the drain and the source, whichever having a higher potential is called the drain, but among thin film transistors provided in unit circuits described below, there are some thin film transistors in which the drain and the source are switched between each other during operation. Thus, in the following description, one of two terminals that function as the drain and/or the source is referred to as a "first conduction terminal" and the other is referred to as a "second conduction terminal". A terminal that functions as the gate of the thin film transistor is referred to as a "control terminal".

FIG. 22 is a circuit diagram illustrating a configuration example of a known unit circuit 9. Note that the unit circuit 9 illustrated in FIG. 22 is assumed to be a unit circuit 9(*n*) at an n-th stage. The unit circuit 9 includes nine thin film transistors T1 to T4, T6 to T10, and one capacitor (capacitance element) C. The unit circuit 9 includes five input terminals 21 to 24, 26 and one output terminal 29. The input terminal 21 is applied with a set signal S that is an output signal Q(n−4) from a unit circuit at a stage four stages before. The input terminal 22 is applied with a reset signal R that is an output signal Q(n+6) from a unit circuit at a stage six stages after. The input terminal 23 is applied with a first clock signal CK1 which is one of a plurality of gate clock signals applied to the gate driver. Here, the plurality of gate clock signals are assumed to be eight-phase clock signals. The input terminal 24 is applied with a second clock signal CK2 that is one of the plurality of gate clock signals. A phase of the second clock signal CK2 is advanced by 45 degrees from a phase of the first clock signal CK1. The input terminal 26 is applied with a low level direct current power supply voltage VSS. An output signal Q(n) is output from the output terminal 29. The output signal Q(n) is applied as a scanning signal to a corresponding gate bus line.

A second conduction terminal of the thin film transistor T1, a first conduction terminal of the thin film transistor T2, a control terminal of the thin film transistor T6, a control terminal of the thin film transistor T7, a control terminal of the thin film transistor T8, a first conduction terminal of the thin film transistor T9, and one end of the capacitor C are connected to each other via a first node N1. A second conduction terminal of the thin film transistor T4, a first conduction terminal of the thin film transistor T7, a control terminal of the thin film transistor T9, and a control terminal of the thin film transistor T10 are connected to each other via a second node N2. A second conduction terminal of the thin film transistor T3, a control terminal of the thin film transistor T4, and a first conduction terminal of the thin film transistor T6 are connected to each other via a third node N3.

Operations of the unit circuit 9 will be described with reference to signal waveform diagrams illustrated in FIG. 23. During a period when a liquid crystal display device including the unit circuit 9 is operating, the unit circuit 9 is applied with the first clock signal CK1 and the second clock signal CK2 each having a duty ratio of approximately 50%.

In a period before time t91, the set signal S, the output signal Q(n), and the reset signal R are maintained at a low level. A potential of the first node N1 is maintained at the low level, a potential of the second node N2 alternately appears at a high level and the low level every predetermined period, and a potential of the third node N3 is maintained at the high level. Note that the potential of the third node N3 alternately appears at a relatively high level and a relatively low level every predetermined period.

At the time t9*i*, the set signal S changes from the low level to the high level. Since the thin film transistor T1 is diode-connected as illustrated in FIG. 22, a pulse of the set signal S sets the thin film transistor T1 to be in the on state, so that the potential of the first node N1 rises. As a result, the thin film transistors T6, T7, and T8 are set to be in the on state. By setting the thin film transistor T6 to be in the on state, the potential of the third node N3 is set to be at the low level. Note that, in the period from the time t9*i* to time t92, the first clock signal CK1 is at the low level, and thus, even when the thin film transistor T8 is in the on state, the output signal Q(n) is maintained at the low level.

At the time t92, the first clock signal CK1 changes from the low level to the high level. At this time, since the thin film transistor T8 is in the on state, the potential of the output terminal 29 rises along with rise of a potential of the input terminal 23. Here, since the capacitor C is provided between the first node N1 and the output terminal 29 as illustrated in FIG. 22, the potential of the first node N1 also rises along with the rise of the potential of the output terminal 29 (the first node N1 is set to be in a boost state). As a result, a large voltage is applied to the control terminal of the thin film transistor T8, and the potential of the output signal Q(n) rises up to a level sufficient to cause the gate bus line connected to the output terminal 29 to be in a select state. Note that, in the period from the time t92 to time t93, the reset signal R is maintained at the low level, and the potential of the second node N2 is also maintained at the low level. Thus, during this period, the thin film transistor T2 and the thin film transistor T10 are maintained in the off state, so that the potential of the first node N1 and the potential of the output signal Q(n) (the potential of the output terminal 29) do not fall.

At the time t93, the first clock signal CK1 changes from the high level to the low level. As a result, the potential of the output terminal 29 falls along with fall of the potential of the input terminal 23. That is, the potential of the output signal Q(n) is set to be at the low level. In addition, the potential of the first node N1 falls via the capacitor C.

At time t94, the reset signal R changes from the low level to the high level. As a result, the thin film transistor T2 is set to be in the on state, and the potential of the first node N1 is set to be at the low level. In a period after the time t94, operations similar to the operations in the period before the time t91 are performed.

Such operations are performed in each unit circuit 9, thus the plurality of gate bus lines provided in the liquid crystal display device are sequentially set to be in the select state, and the image signals are sequentially written into the pixel capacitances on the row-by-row basis. Note that, in the following description, a period (in the example illustrated in FIG. 23, a period from the time t91 to time t94) when the potential of the first node N1 is to be maintained at the high level in each unit circuit is referred to as a "select period", and a period other than the select period is referred to as a "non-select period".

The unit circuit 9 having the configuration illustrated in FIG. 22 is provided with a stabilization circuit 91 for reliably maintaining the potential of the output terminal 29 at the low level during the non-select period. The stabilization circuit 91 includes the third node N3 connected to the control terminal of the thin film transistor T4 for controlling the potential of the second node (a node connected to the control terminal of the thin film transistor T10 for controlling the potential of the output terminal 29) N2. By appropriately controlling the potentials of the second node N2 and the third node N3, the states of the thin film transistor T10 and the thin film transistor T4 are appropriately controlled, and the operation of the unit circuit 9 is stabilized. In the example illustrated in FIG. 23, the potential of the second node N2 repeats a change from the low level to the high level and a change from the high level to the low level throughout the non-select period, and thus the thin film transistor T10 is set to be in the on state every predetermined period. As a result, in the non-select period, even when the potential of the output terminal 29 fluctuates due to, for example, noise, the potential of the output terminal 29 is pulled to the low level every predetermined period.

A configuration of the unit circuit in the shift register provided in the display device is disclosed in, for example, JP 2019-045673 A, JP 2014-063164 A, JP 2010-262296 A, JP 2013-142899 A, and JP 2010-218673 A.

SUMMARY

Regarding the operation of the unit circuit 9, in the example illustrated in FIG. 23, in the non-select period, in the period when the second clock signal CK2 is at the high level, the thin film transistor T3 is set to be in the on state and the third node N3 is maintained at the high level, and thus the thin film transistor T4 is maintained in the on state, so that the potential of the second node N2 is set to be at the high level. In the non-select period, when the second clock signal CK2 changes from the high level to the low level, the thin film transistor T3 is set to be in the off state and the third node N3 is set to be in a floating state, but the potential of the second node N2 is set to be at the low level along with fall of the potential of the input terminal 24.

As described above, according to the configuration of the known unit circuit 9, charging and discharging of the second node N2 are repeated throughout the non-select period. This causes an increase in power consumption of the gate driver. With respect to the thin film transistor T10 for controlling the potential of the output terminal 29, the change from the on state to the off state and the change from the off state to the on state are frequently repeated, and thus a pull-down function for pulling the potential of the output terminal 29 to the low level is not normally operated in some cases. Similarly, with respect to the thin film transistor T9 for controlling the potential of the first node N1, the change from the on state to the off state and the change from the off state to the on state are frequently repeated, and thus the pull-down function for pulling the potential of the first node N1 to the low level is not normally operated in some cases as well.

Thus, an object of the following disclosure is to achieve reduction of power consumption and stabilization of operations of the gate driver (particularly, a monolithic gate driver).

(1) A scanning signal line drive circuit according to some embodiments of the disclosure is a scanning signal line drive circuit configured to drive a plurality of scanning signal lines, the scanning signal line drive circuit including

- a shift register configured to operate based on a plurality of clock signals and including a plurality of stages corresponding to the plurality of scanning signal lines on a one-to-one basis, wherein
- a unit circuit constituting each of the plurality of stages included in the shift register includes
- a first node,
- a second node,
- a third node,
- a first output node configured to output an output signal to a corresponding one of the plurality of scanning signal lines,
- a first output control transistor including a control terminal connected to the first node, a first conduction terminal applied with one of the plurality of clock signals, and a second conduction terminal connected to the first output node,
- a first node pull-up unit configured to change a potential of the first node toward an on level, based on a set signal, a first node pull-down unit configured to change the potential of the first node toward an off level, based on a reset signal, a stabilization transistor including a control terminal connected to the second node, a first conduction terminal connected to the first node or the first output node, and a second conduction terminal applied with an off level potential, and a stabilization circuit connected to the second node, the stabilization circuit includes a second node pull-up transistor including a control terminal connected to the third node, a first conduction terminal applied with one of the plurality of clock signals, and a second conduction terminal connected to the second node, a first second node pull-down transistor including a control terminal connected to the first node, a first conduction terminal connected to the second node, and a second conduction terminal applied with an off level potential, a first third node pull-down transistor including a control terminal connected to the first node, a first conduction terminal connected to the third node, and a second conduction terminal applied with an off level potential, a third node pull-up transistor including a control terminal and a first conduction terminal that are applied with one of the plurality of clock signals and including a second conduction terminal connected to the third node, and a second third node pull-down transistor including a control terminal applied with one of the plurality of clock signals, a first conduction terminal connected to the third node, and a second conduction terminal applied with an off level potential, and a clock signal applied to the control terminal of the second third node pull-down transistor changes from the off level to the on level at a timing when a clock signal applied to the control terminal of the third node pull-up transistor changes from the on level to the off level.

(2) The scanning signal line drive circuit according to some embodiments of the disclosure includes the configuration of (1) described above, wherein the set signal is an output signal output from a first output node of a unit circuit constituting a stage before a present stage, and the reset signal is an output signal output from a first output node of a unit circuit constituting a stage after the present stage.

(3) The scanning signal line drive circuit according to some embodiments of the disclosure includes the configuration of (1) described above, wherein, the unit circuit includes a second output node configured to output an other-stage control signal configured to control operations of a unit circuit constituting a stage before a present stage and a unit circuit constituting a stage after the present stage, and a second output control transistor including a control terminal connected to the first node, a first conduction terminal applied with one of the plurality of clock signals, and a second conduction terminal connected to the second output node, a clock signal applied to the first conduction terminal of the first output control transistor and a clock signal applied to the first conduction terminal of the second output control transistor are the same clock signal, the set signal is an other-stage control signal output from a second output node of a unit circuit constituting a stage before the present stage, and the reset signal is an other-stage control signal output from a second output node of a unit circuit constituting a stage after the present stage.

(4) The scanning signal line drive circuit according to some embodiments of the disclosure includes the configuration of (1) described above, wherein the first node pull-up unit includes a first node pull-up transistor, the first node pull-up transistor including a control terminal and a first conduction terminal that are applied with the set signal and including a second conduction terminal connected to the first node.

(5) The scanning signal line drive circuit according to some embodiments of the disclosure includes the configuration of (1) described above, wherein the first node pull-down unit includes a first first node pull-down transistor, the first first node pull-down transistor including a control terminal applied with the reset signal, a first conduction terminal connected to the first node, and a second conduction terminal applied with an off level potential.

(6) The scanning signal line drive circuit according to some embodiments of the disclosure includes the configuration of (1) described above, wherein the unit circuit includes, as the stabilization transistor, a second first node pull-down transistor including a first conduction terminal connected to the first node.

(7) The scanning signal line drive circuit according to some embodiments of the disclosure includes the configuration of (1) described above, wherein the unit circuit includes, as the stabilization transistor, a first output node pull-down transistor including a first conduction terminal connected to the first output node.

(8) The scanning signal line drive circuit according to some embodiments of the disclosure includes the configuration of (1) described above, wherein the unit circuit includes, as the stabilization transistor, a second first node pull-down transistor including a first conduction terminal connected to the first node and a first output node pull-down transistor including a first conduction terminal connected to the first output node.

(9) The scanning signal line drive circuit according to some embodiments of the disclosure includes the configuration of (1) described above, wherein the unit circuit includes a second second node pull-down transistor, the second second node pull-down transistor including a control terminal applied with the set signal, a first conduction terminal connected to the second node, and a second conduction terminal applied with an off level potential.

(10) The scanning signal line drive circuit according to some embodiments of the disclosure includes the configuration of (1) described above, wherein the plurality of clock signals are P-phase clock signals with P being a natural number, and a phase of a clock signal applied to the control terminal of the third node pull-up transistor is advanced by (360/P) degrees from a phase of a clock signal applied to the first conduction terminal of the first output control transistor.

(11) The scanning signal line drive circuit according to some embodiments of the disclosure includes the configuration of (1) described above, wherein a clock signal applied to the control terminal of the third node pull-up transistor and a clock signal applied to the first conduction terminal of the first output control transistor are the same clock signal.

(12) The scanning signal line drive circuit according to some embodiments of the disclosure includes the configuration of (1) described above, wherein a channel length of the third node pull-up transistor is longer than a channel length of any of the first output control transistor, the stabilization transistor, the second node pull-up transistor, the first second node pull-down transistor, the first third node pull-down transistor, and the second third node pull-down transistor.

(13) A scanning signal line drive circuit according to some embodiments of the disclosure is a scanning signal line drive circuit configured to drive a plurality of scanning signal lines, the scanning signal line drive circuit including a shift register configured to operate based on a plurality of clock signals and including a plurality of stages corresponding to the plurality of scanning signal lines on a one-to-one basis, wherein a unit circuit constituting each of the plurality of stages included in the shift register includes a first node, a second node, a third node, a first output node configured to output an output signal to a corresponding one of the plurality of scanning signal lines, a first output control transistor including a control terminal connected to the first node, a first conduction terminal applied with one of the plurality of clock signals, and a second conduction terminal connected to the first output node, a first node pull-up unit configured to change a potential of the first node toward an on level, based on a set signal, a first node pull-down unit configured to change a potential of the first node toward an off level, based on a reset signal, a stabilization transistor including a control terminal connected to the second node, a first conduction terminal connected to the first node or the first output node, and a second conduction terminal applied with an off level potential, and a stabilization circuit connected to the second node, the stabilization circuit includes a second node pull-up transistor including a control terminal connected to the third node, a first conduction terminal applied with one of the plurality of clock signals, and a second conduction terminal connected to the second node, a second node pull-down transistor including a control terminal connected to the first node, a first conduction terminal connected to the second node, and a second conduction terminal applied with an off level potential, a first third node pull-down transistor including a control terminal connected to the first node, a first conduction terminal connected to the third node, and a second conduction terminal applied with an off level potential, a third node pull-up transistor including a control terminal and a first conduction terminal that are applied with one of the plurality of clock signals and including a second conduction terminal connected to the third node, and a second third node pull-down transistor including a control terminal and a first conduction terminal that are connected to the third node and including a second conduction terminal applied with one of the plurality of clock signals, and a clock signal applied to the control terminal of the third node pull-up transistor and a clock signal applied to the second conduction terminal of the second third node pull-down transistor are the same clock signal.

(14) The scanning signal line drive circuit according to some embodiments of the disclosure includes the configuration of (13) described above, wherein the set signal is an output signal output from a first output node of a unit circuit constituting a stage before a present stage, and the reset signal is an output signal output from a first output node of a unit circuit constituting a stage after the present stage.

(15) The scanning signal line drive circuit according to some embodiments of the disclosure includes the configuration of (13) described above, wherein the unit circuit includes a second output node configured to output an other-stage control signal configured to control operations of a unit circuit constituting a stage before a present stage and a unit circuit constituting a stage after the present stage, and a second output control transistor including a control terminal connected to the first node, a first conduction terminal applied with one of the plurality of clock signals, and a second conduction terminal connected to the second output node, a clock signal applied to the first conduction terminal of the first output control transistor and a clock signal applied to the first conduction terminal of the second output control transistor are the same clock signal, the set signal is an other-stage control signal output from a second output node of a unit circuit constituting a stage before the present stage, and the reset signal is an other-stage control signal output from a second output node of a unit circuit constituting a stage after the present stage.

(16) A display device according to some embodiments of the disclosure includes a substrate;

a plurality of image signal lines formed on the substrate;

a plurality of scanning signal lines formed on the substrate and intersecting the plurality of image signal lines;

a plurality of pixel forming sections formed on the substrate, each of the plurality of pixel forming sections corresponding to a respective one of intersections of the plurality of image signal lines and the plurality of scanning signal lines;

an image signal line drive circuit configured to drive the plurality of image signal lines; and a scanning signal line drive circuit having any one of the configurations (1) to (15) formed on the substrate and configured to drive the plurality of scanning signal lines.

(17) The display device according to some embodiments of the disclosure includes the configuration of (16) described above, wherein a region on the substrate includes a display region with the plurality of pixel forming sections formed, a shift register region with the shift register formed, and a main wiring line region with a plurality of clock signal main wiring lines formed, the plurality of clock signal main wiring lines configured to transmit the plurality of clock signals, the shift register region is provided between the display region and the main wiring line region, and each unit circuit is provided with a clock signal branch wiring line including one end connected to one of the plurality of clock signal main wiring lines and the other end connected to the control terminal of the second third node pull-down transistor.

(18) The display device according to some embodiments of the disclosure includes the configuration of (17) described above, wherein the plurality of image signal lines are formed of a first metal film, the plurality of scanning signal lines are formed of a second metal film, the plurality of clock signal main wiring lines are formed of the first metal film, the clock signal branch wiring line is formed of the second metal film, and the clock signal branch wiring line is connected to one of the plurality of clock signal main wiring lines via a contact hole in the main wiring line region.

(19) The display device according to some embodiments of the disclosure includes the configuration of (16) described above, wherein a region on the substrate includes a display region with the plurality of pixel forming sections formed, a shift register region with the shift register formed, and a main wiring line region with a plurality of clock signal main wiring lines formed, the plurality of clock signal main wiring lines configured to transmit the plurality of clock signals, the shift register region is provided between the display region and the main wiring line region, and the first conduction terminal of the first output control transistor included in a unit circuit at an (n−1)-th stage and the control terminal and the first conduction terminal of the third node pull-up transistor included in a unit circuit at an n-th stage are connected to the same clock signal branch wiring line including one end connected to one of the plurality of clock signal main wiring lines, with n being a natural number.

According to the scanning signal line drive circuit according to some embodiments of the disclosure, the unit circuit constituting each of the stages of the shift register is provided with the second third node pull-down transistor including the control terminal applied with one of the plurality of clock signals, the first conduction terminal connected to the third node, and the second conduction terminal applied with the off level potential. Different clock signals (for example, clock signals whose phases are shifted to each other by 180 degrees) are applied to the control terminal of the third node pull-up transistor configured to change a potential of the third node toward the on level and the control terminal of the second third node pull-down transistor. Thus, in each unit circuit, the potential of the third node repeats a change from the off level to the on level and a change from the on level to the off level during the non-select period. The clock signal applied to the control terminal of the second third node pull-down transistor changes from the off level to the on level at a timing when the clock signal applied to the control terminal of the third node pull-up transistor changes from the on level to the off level. Thus, in the period when the clock signal applied to the control terminal of the third node pull-up transistor is at the off level, the potential of the third node is at the off level and the second node pull-up transistor is maintained in the off state. As described above, the potential of the second node is maintained at the on level throughout the non-select period. That is, excessive charging and discharging of the second node is suppressed. As a result, power consumption is reduced. Since the stabilization transistor including the control terminal connected to the second node is prevented from repeating the change from the on state to the off state and the change from the off state to the on state during the non-select period, deterioration of the stabilization transistor is suppressed. As a result, the operation of pulling the potential of the first node or the first output node to the off level is stably performed. As described above, reduction of the power consumption and the stabilization of the operations of the scanning signal line drive circuit are achieved.

According to the scanning signal line drive circuit according to some other embodiments of the disclosure, the unit circuit constituting each of the stages of the shift register is provided with the second third node pull-down transistor including the control terminal connected to the third node, the first conduction terminal connected to the third node, and the second conduction terminal applied with one of the plurality of clock signals. The same clock signal is applied to the control terminal of the third node pull-up transistor configured to change the potential of the third node toward the on level and the second conduction terminal of the second third node pull-down transistor. With the configuration described above, in each unit circuit, the potential of the third node repeats the change from the off level to the on level and the change from the on level to the off level during the non-select period. In this regard, when the clock signal applied to the control terminal of the third node pull-up transistor changes from the on level to the off level, the potential of the third node changes from the on level to the off level via the second third node pull-down transistor. Thus, in the period when the clock signal applied to the control terminal of the third node pull-up transistor is at the off level, the potential of the third node is at the off level and the second node pull-up transistor is maintained in the off state. As described above, the potential of the second node is maintained at the on level throughout the non-select period. That is, excessive charging and discharging of the second node is suppressed. As a result, the power consumption is reduced. Since the stabilization transistor including the control terminal connected to the second node is prevented from repeating the change from the on state to the off state and the change from the off state to the on state during the non-select period, deterioration of the stabilization transistor is suppressed. As a result, the operation of pulling the potential of the first node or the first output node to the off level is stably performed. As described above, reduction of the power consumption and the stabilization of the operations of the scanning signal line drive circuit are achieved.

BRIEF DESCRIPTION OF DRAWINGS

The disclosure will be described with reference to the accompanying drawings, wherein like numbers reference like elements.

DESCRIPTION OF EMBODIMENTS

An embodiment will be described below with reference to the accompanying drawings. Note that it is assumed that all transistors according to the present embodiment are n-channel thin film transistors, but the disclosure is not limited to this.

1. Overall Configuration and Operation Outline

Figure 2:
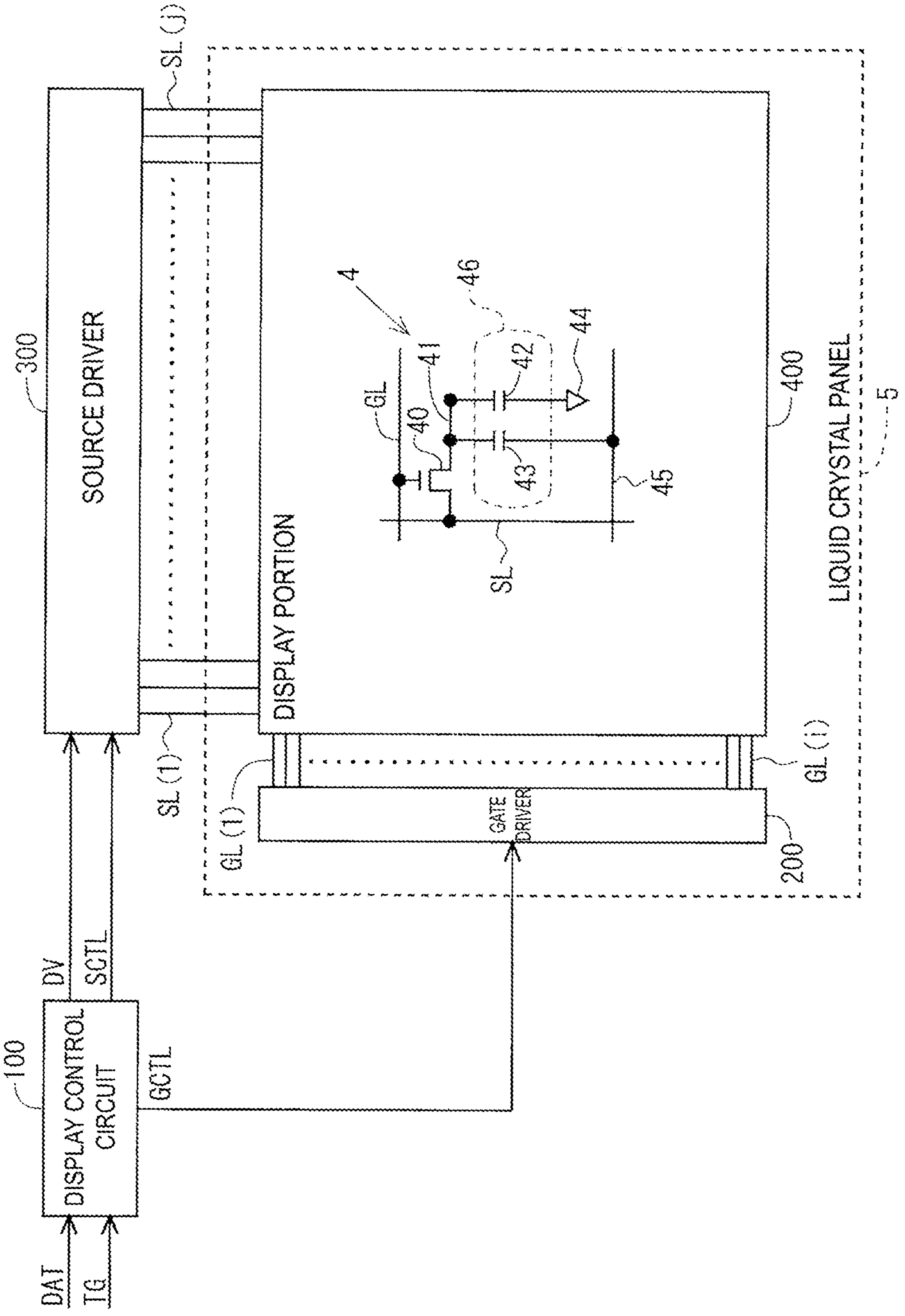
FIG. 2 is a block diagram illustrating an overall configuration of an active matrix liquid crystal display device according to the embodiment.

FIG. 2 is a block diagram illustrating an overall configuration of an active matrix liquid crystal display device according to an embodiment. The liquid crystal display device includes a display control circuit 100, a gate driver (scanning signal line drive circuit) 200, a source driver (image signal line drive circuit) 300, and a display portion (display region) 400. In the present embodiment, a pixel circuit included in the display portion 400 and the gate driver 200 are integrally formed on a substrate (active matrix substrate) of two substrates constituting a liquid crystal panel 5. In other words, the gate driver 200 according to the present embodiment is a monolithic gate driver.

The display portion 400 includes a plurality of (j) source bus lines (image signal lines) SL(1) to SL(j) and a plurality of (i) gate bus lines (scanning signal lines) GL(1) to GL(i) disposed therein. A pixel forming section 4 that forms a pixel is provided corresponding to each of intersections of the plurality of (j) source bus lines SL(1) to SL(j) and the plurality of (i) gate bus lines GL (1) to GL (i). In other words, the display portion 400 includes a plurality of (i×j) the pixel forming sections 4. Each pixel forming section 4 includes a thin film transistor (pixel TFT) 40 serving as a switching element with the control terminal connected to a gate bus line GL passing through a corresponding intersection and with the first conduction terminal connected to a source bus line SL passing through the corresponding intersection, a pixel electrode 41 connected to a second conduction terminal of the thin film transistor 40, a common electrode 44 and an auxiliary capacitance electrode 45 provided in common to the plurality of pixel forming sections 4, a liquid crystal capacitance 42 formed with the pixel electrode 41 and the common electrode 44, and an auxiliary capacity 43 formed with the pixel electrode 41 and the auxiliary capacitance electrode 45. A pixel capacitance 46 includes the liquid crystal capacitance 42 and the auxiliary capacity 43. Note that, in FIG. 2, only one pixel forming section 4 is illustrated.

The display control circuit 100 receives an image signal DAT and a group of timing signals TG such as a horizontal synchronization signal and a vertical synchronization signal transmitted from the outside, and outputs a digital video signal DV, a gate control signal GCTL for controlling an operation of the gate driver 200, and a source control signal SCTL for controlling an operation of the source driver 300. That is, the display control circuit 100 controls the operations of the gate driver 200 and the source driver 300. Note that the gate control signal GCTL includes a gate start pulse signal, a clear signal, and a gate clock signal, and the source control signal SCTL includes a source start pulse signal, a source clock signal, and a latch strobe signal.

The gate driver 200 repeats application of an active scanning signal to each of the gate bus lines GL in one vertical scanning period as a cycle, based on the gate control signal GCTL transmitted from the display control circuit 100. Note that a configuration may also be employed in which the gate driver 200 is provided on both one end side and the other end side of the gate bus lines GL (that is, a configuration in which the gate driver 200 is provided on both the left side and the right side of the display portion 400 in FIG. 2). The gate driver 200 will be described below in detail.

The source driver 300 applies a driving image signal to each of the source bus lines SL(1) to SL(j), based on the digital video signal DV and the source control signal SCTL transmitted from the display control circuit 100. At this time, the source driver 300 sequentially holds the digital video signals DV each indicating a voltage to be applied to a respective one of the source bus lines SL, at a timing when pulses of the source clock signal are generated. Then the held digital video signals DV are converted into analog voltages at a timing when pulses of the latch strobe signal are generated. Such converted analog voltages, as the driving image signals, are applied simultaneously to all of the source bus lines SL(1) to SL(j).

As described above, the driving image signals are applied to the source bus lines SL(1) to SL(j), and the scanning signals are applied to the gate bus lines GL(1) to GL(i). As a result, an image based on the image signal DAT transmitted from the outside is displayed on the display portion 400.

2. Gate Driver

Figure 3:
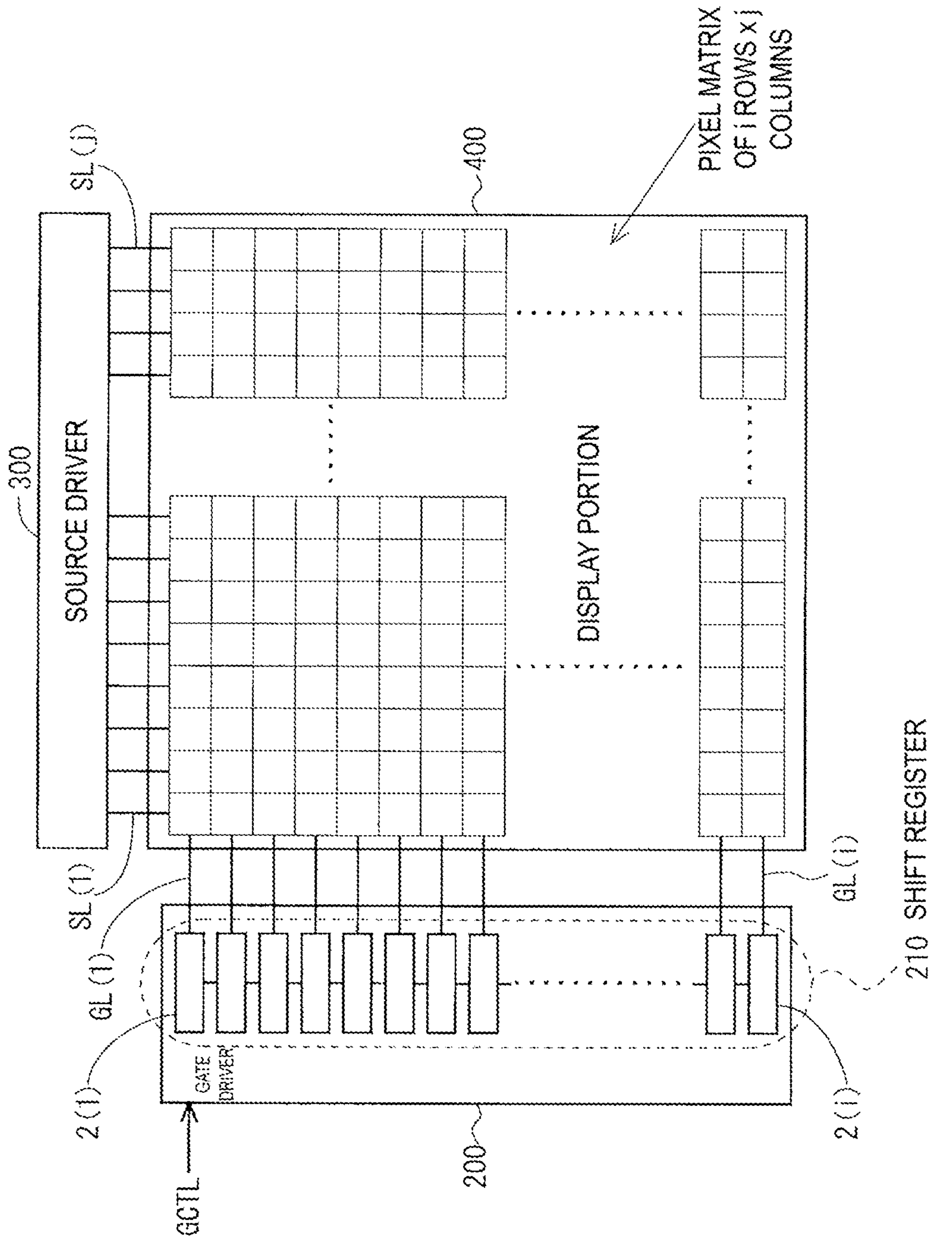
FIG. 3 is a block diagram for describing a schematic configuration of a gate driver in the embodiment.

FIG. 3 is a block diagram for describing a schematic configuration of the gate driver 200 according to the present embodiment. As illustrated in FIG. 3, the gate driver 200 includes a shift register 210 including a plurality of stages. The display portion 400 has a pixel matrix formed in i rows×j columns, and each of the stages of the shift register 210 is provided corresponding to a respective one of the rows of the pixel matrix on a one-to-one basis. In other words, the shift register 210 includes i unit circuits 2(1) to 2 (*i*). Note that, more specifically, for example, four unit circuits as dummy stages are provided before the first stage and after the i-th stage (not illustrated in FIG. 3). Note that, since the dummy stages are not directly related to the disclosure, a description thereof is omitted. The configuration and the operation of the gate driver 200 will be described below in detail.

2.1 Overall Configuration and Operation of Shift Register

Figure 4:
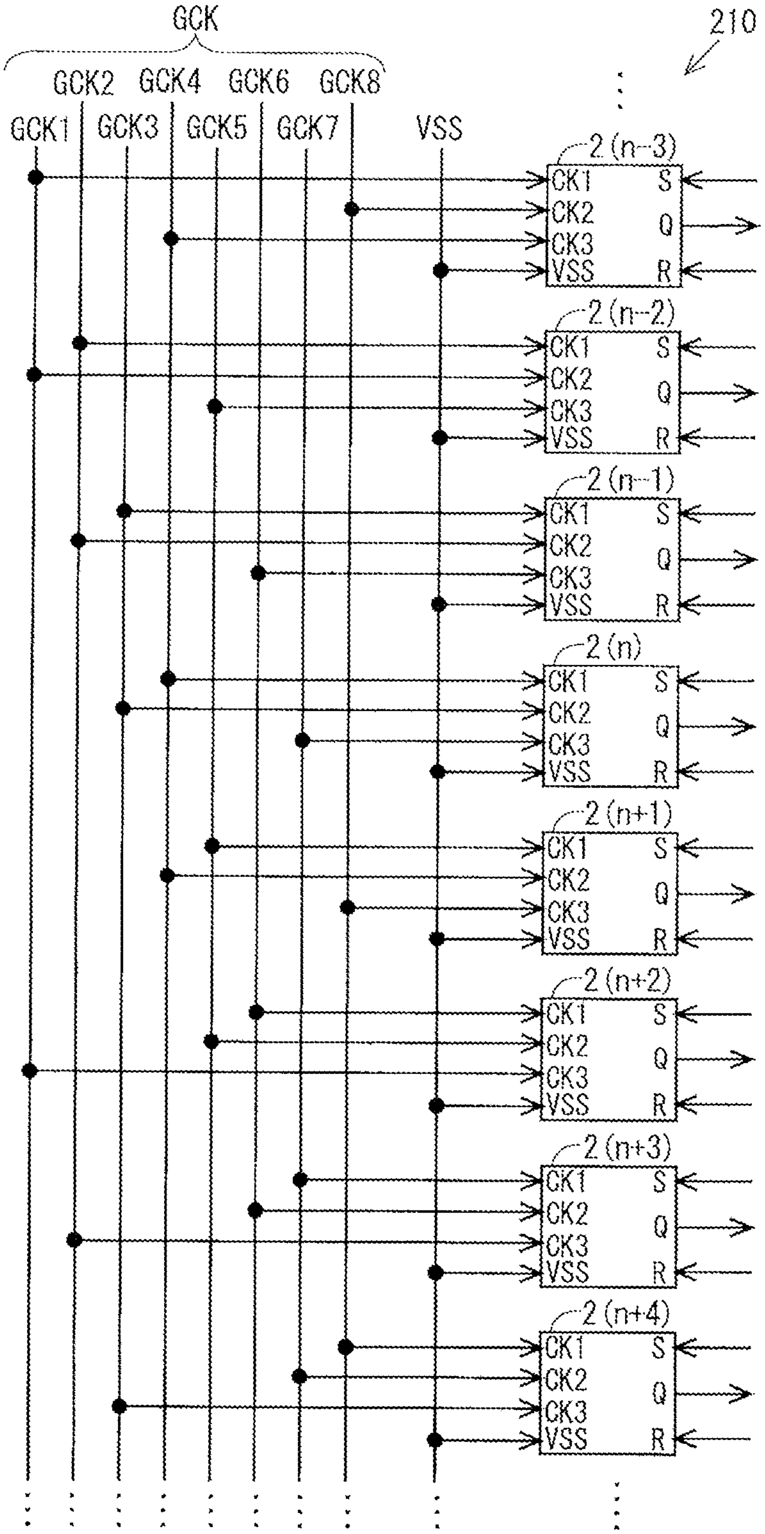
FIG. 4 is a block diagram illustrating a configuration of a shift register in the gate driver in the embodiment.

FIG. 4 is a block diagram illustrating a configuration of the shift register 210 in the gate driver 200. As described above, the shift register 210 includes i unit circuits 2(1) to 2(*i*). Note that, in FIG. 4, the unit circuits 2(*n*−3) to 2(*n*+4) provided at the (n−3)-th stage to the (n+4)-th stage are illustrated. In the following description, the unit circuit is denoted by a reference sign 2 when there is no need to distinguish the i unit circuits 2(1) to 2(*i*) from each other.

Figure 5:
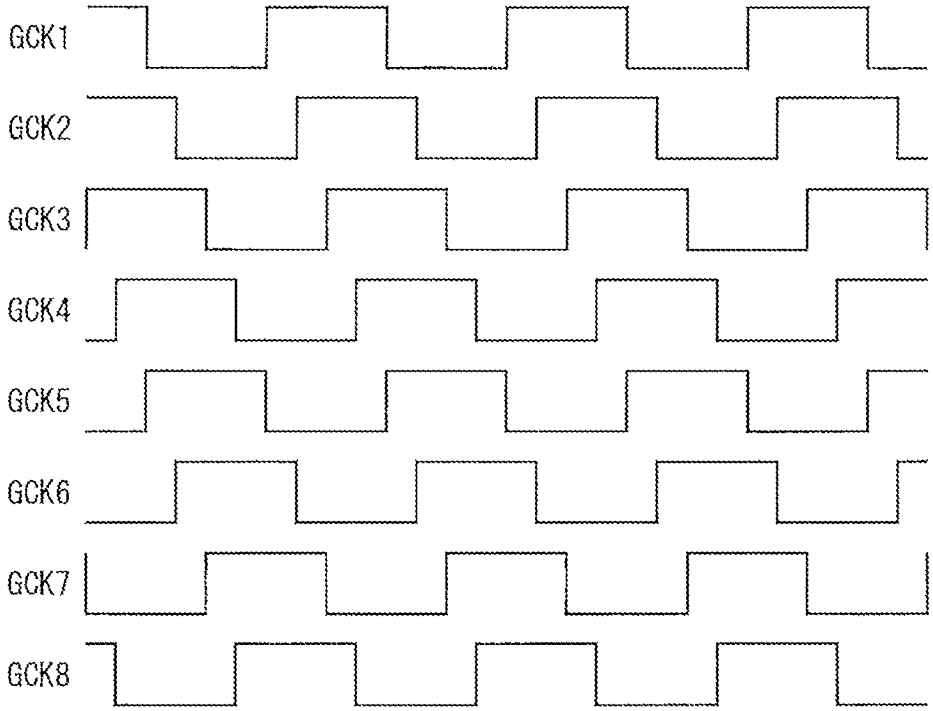
FIG. 5 is waveform diagrams of gate clock signals in the embodiment.

As the gate control signals GCTL, gate start pulse signals (not illustrated in FIG. 4), clear signals (not illustrated in FIG. 4), and the gate clock signals GCK (GCK1 to GCK8) are applied to the shift register 210. A low level direct current power supply voltage VSS is also applied to the shift register 210. FIG. 5 is waveform diagrams of the gate clock signals GCK1 to GCK8. As understood from FIG. 5, the gate clock signals GCK1 to GCK8 are eight-phase clock signals, and duty ratios of all the gate clock signals GCK1 to GCK8 are approximately 50%. Note that, when the gate clock signal GCK1 is taken as a reference, the phase of the gate clock signal GCKz (z is from 2 to 8) is delayed by (45×(z−1) degrees relative to the phase of the gate clock signal GCK1, as illustrated in FIG. 5.

Each unit circuit 2 includes an input terminal that receives any of the gate clock signals GCK1 to GCK8 as a first clock signal CK1, an input terminal that receives any of the gate clock signals GCK1 to GCK8 as a second clock signal CK2, an input terminal that receives any of the gate clock signals GCK1 to GCK8 as a third clock signal CK3, an input terminal that receives a set signal S, an input terminal that receives a reset signal R, an input terminal that receives the low level direct current power supply voltage VSS, and an output terminal for outputting an output signal Q.

Figure 6:
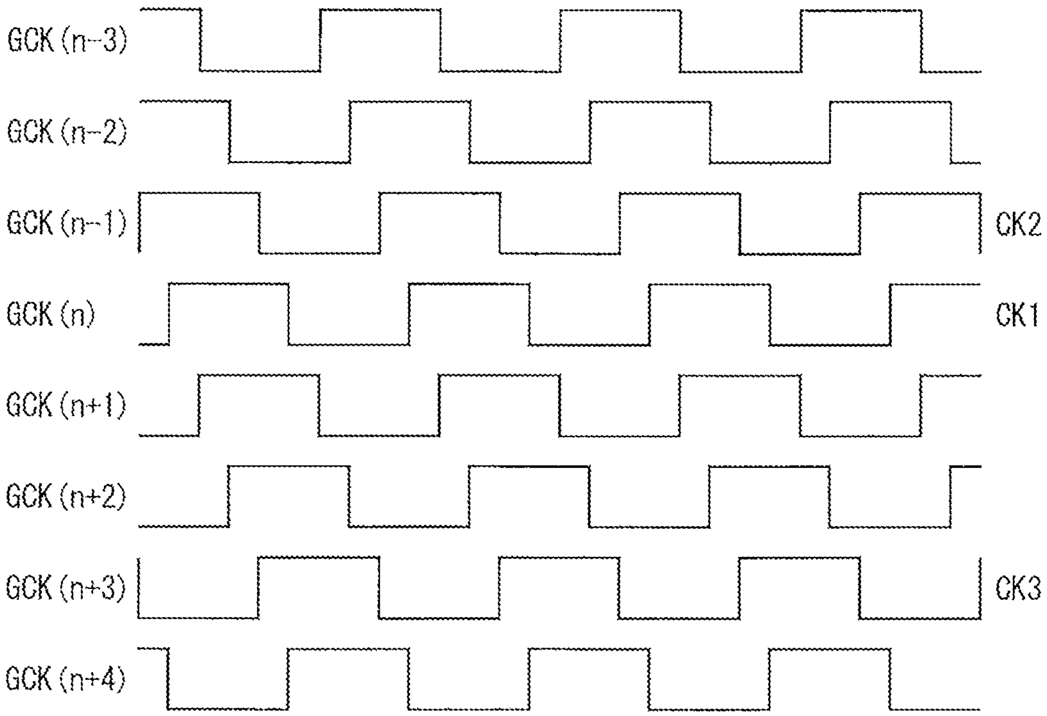
FIG. 6 is signal waveform diagrams for describing a phase relationship between a plurality of gate clock signals in the embodiment.

When a gate clock signal input as the first clock signal CK1 to the unit circuit 2(*n*) at the n-th stage is represented by GCK(n), a gate clock signal whose phase is advanced by K degrees from the phase of the gate clock signal GCK(n) is represented by GCK(n−K/45), and a gate clock signal whose phase is delayed by K degrees from the phase of the gate clock signal GCK(n) is represented by GCK(n+K/45), the waveforms of the eight-phase gate clock signals are represented as illustrated in FIG. 6. In the present embodiment, a gate clock signal GCK(n−1) as the second clock signal CK2, and a gate clock signal GCK(n+3) as the third clock signal CK3 are input to the unit circuit 2 (*n*) at the n-th stage. Thus, in each unit circuit 2, a phase of the second clock signal CK2 is advanced by 45 degrees from a phase of the first clock signal CK1, and a phase of the third clock signal CK3 is delayed by 135 degrees from the phase of the first clock signal CK1.

Figure 7:
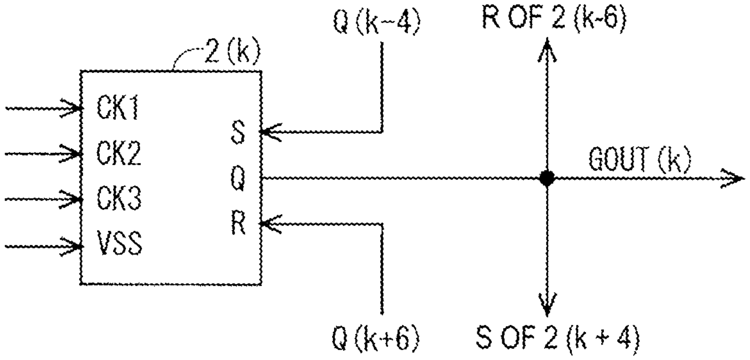
FIG. 7 is a diagram for describing input/output signals of the unit circuit in the embodiment.

Signals as described below are applied to input terminals of the respective stages (respective unit circuits 2) of the shift register 210. The unit circuit 2(*n*−3) at the (n−3)-th stage is applied with the gate clock signal GCK1 as the first clock signal CK1, and is applied with the gate clock signal GCK8 as the second clock signal CK2, and is applied with the gate clock signal GCK4 as the third clock signal CK3. The unit circuit 2(*n*−2) at the (n−2)-th stage is applied with the gate clock signal GCK2 as the first clock signal CK1, is applied with the gate clock signal GCK1 as the second clock signal CK2, and is applied with the gate clock signal GCK5 as the third clock signal CK3. The unit circuit 2 (n−1) at the (n−1)-th stage is applied with the gate clock signal GCK3 as the first clock signal CK1, is applied with the gate clock signal GCK2 as the second clock signal CK2, and is applied with the gate clock signal GCK6 as the third clock signal CK3. The unit circuit 2 (*n*) at the n-th stage is applied with the gate clock signal GCK4 as the first clock signal CK1, is applied with the gate clock signal GCK3 as the second clock signal CK2, and is applied with the gate clock signal GCK7 as the third clock signal CK3. The unit circuit 2 (n+1) at the (n+1)-th stage is applied with the gate clock signal GCK5 as the first clock signal CK1, is applied with the gate clock signal GCK4 as the second clock signal CK2, and is applied with the gate clock signal GCK8 as the third clock signal CK3. The unit circuit 2(*n*+2) at the (n+2)-th stage is applied with the gate clock signal GCK6 as the first clock signal CK1, is applied with the gate clock signal GCK5 as the second clock signal CK2, and is applied with the gate clock signal GCK1 as the third clock signal CK3. The unit circuit 2 (n+3) at the (n+3)-th stage is applied with the gate clock signal GCK7 as the first clock signal CK1, is applied with the gate clock signal GCK6 as the second clock signal CK2, and is applied with the gate clock signal GCK2 as the third clock signal CK3. The unit circuit 2 (n+4) at the (n+4)-th stage is applied with the gate clock signal GCK8 as the first clock signal CK1, is applied with the gate clock signal GCK7 as the second clock signal CK2, and is applied with the gate clock signal GCK3 as the third clock signal CK3. Such a configuration is repeated every eight stages through all the stages of the shift register 210. As illustrated in FIG. 7, with respect to a unit circuit 2(*k*) at a chosen stage (k-th stage in this case: k is an integer of 1 or more and i or less), an output signal Q(k−4) output from a unit circuit 2 (k−4) at a stage four stages prior to the chosen stage is applied as a set signal S, and an output signal Q(k+6) output from a unit circuit 2(*k*+6) at a stage six stages after the chosen stage is applied as a reset signal R. Note that the gate start pulse signal is applied as the set signal S to a predetermined number of the unit circuits 2 on the first stage side, and a clear signal is applied as the reset signal R to a predetermined number of the unit circuits 2 on the last stage side. Only one gate start pulse signal may be used, or a plurality of the gate start pulse signals may be used. This similarly applies to the clear signal. The low level direct current power supply voltage VSS is applied in common to all of the unit circuits 2(1) to 2(*i*).

The output signal Q is output from an output terminal (of each of the unit circuits 2) at each of the stages of the shift register 210 (see FIG. 7). The output signal Q output from the chosen stage (k-th stage in this case: k is an integer of 1 or more and i or less) is applied as a scanning signal GOUT(k) to a gate bus line GL(k) of k-th row. In addition, the output signal Q is applied as the reset signal R to a unit circuit 2(*k*−6) at a stage six stages prior to the chosen stage, and applied as the set signal S to a unit circuit 2(*k*+4) at a stage four stages after the chosen stage.

Figure 8:
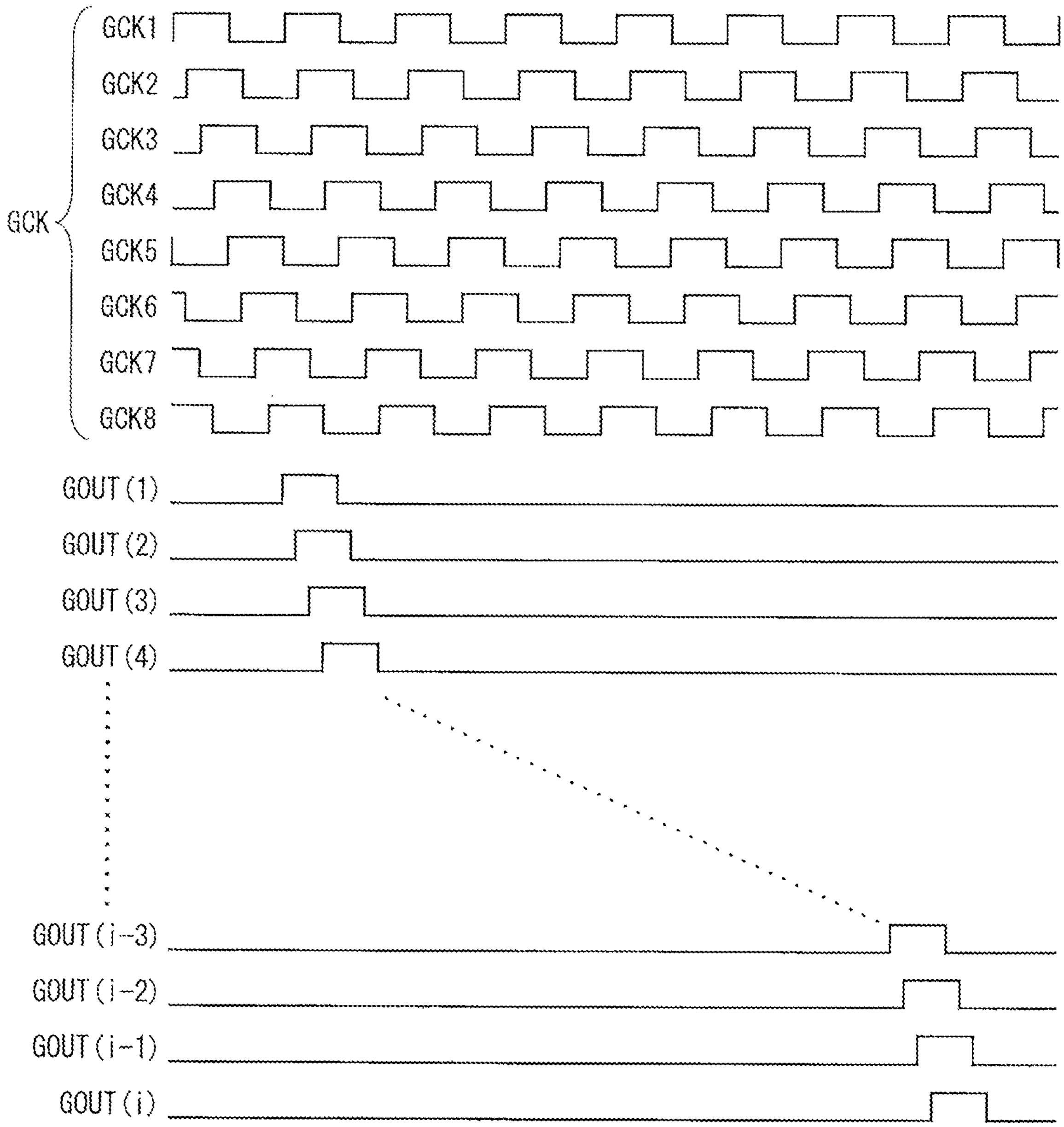
FIG. 8 is signal waveform diagrams for describing operations of the gate driver in the embodiment.

In the above-described configuration, when a pulse of the gate start pulse signal as the set signal S is applied to the unit circuit 2 as a dummy stage provided at a stage prior to the first stage of the shift register 210, based on the clock operations of the gate clock signals GCK1 to GCK8, a shift pulse included in the output signal Q output from each unit circuit 2 is sequentially transferred from the unit circuit 2(1) at the first stage to the unit circuit 2(*i*) at the i-th stage. Then, in response to the transfer of the shift pulse, the output signals Q (scanning signals GOUT) output from the respective unit circuits 2 are sequentially set to be at the high level. As a result, as illustrated in FIG. 8, the scanning signals GOUT(1) to GOUT(i), which sequentially reach the high level (active) for a predetermined time period, are applied to the gate bus lines GL(1) to GL(i) in the display portion 400. In other words, i number of gate bus lines GL(1) to GL(i) are sequentially set to be in the select state.

Note that, although the eight-phase clock signals each having a duty ratio of approximately 50% are used as the gate clock signals GCK in the present embodiment, the duty ratio and the number of phases of the gate clock signal GCK are not particularly limited thereto.

2.2 Configuration of Unit Circuit

Figure 1:
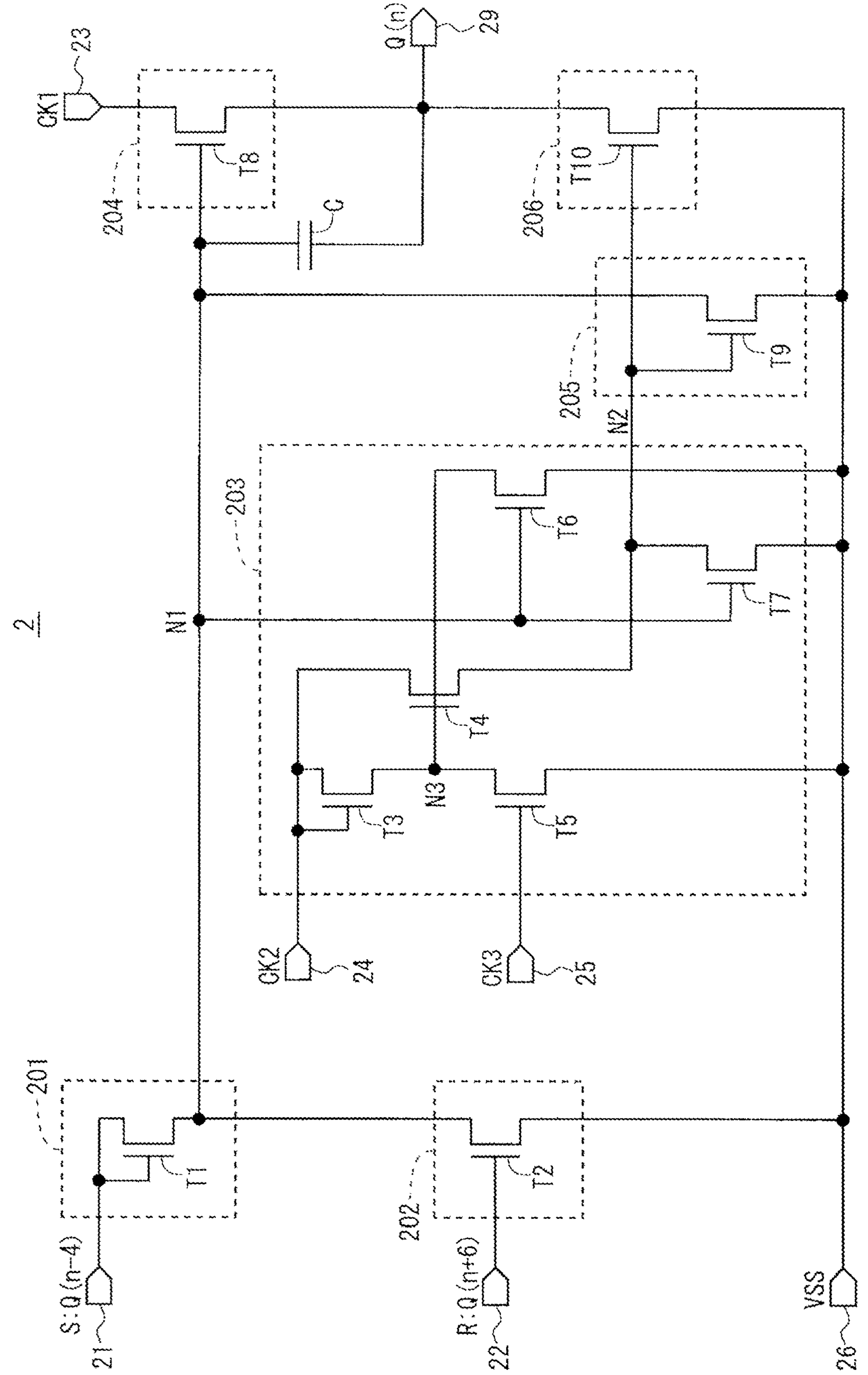
FIG. 1 is a circuit diagram illustrating a configuration of a unit circuit (configuration of one stage of a shift register) according to an embodiment.

FIG. 1 is a circuit diagram illustrating a configuration of the unit circuit 2 according to the present embodiment. Note that the unit circuit 2 illustrated in FIG. 1 is assumed to be the unit circuit 2(*n*) at the n-th stage. As illustrated in FIG. 1, the unit circuit 2 includes 10 thin film transistors T1 to T10 and one capacitor (capacitance element) C. The unit circuit 2 includes six input terminals 21 to 26 and one output terminal 29. The input terminal 21 is applied with a set signal S that is an output signal Q(n−4) from a unit circuit at a stage four stages before. The input terminal 22 is applied with a reset signal R that is an output signal Q(n+6) from a unit circuit at a stage six stages after. The input terminal 23 is applied with one of the gate clock signals GCK1 to GCK8 as the first clock signal CK1. In the present embodiment, as illustrated in FIG. 4, the unit circuit 2(*n*) at the n-th stage is applied with the gate clock signal GCK4 as the first clock signal CK1. The input terminal 24 is applied with one of the gate clock signals GCK1 to GCK8 as the second clock signal CK2. In the present embodiment, as illustrated in FIG. 4, the unit circuit 2(*n*) at the n-th stage is applied with the gate clock signal GCK3 as the second clock signal CK2. The input terminal 25 is applied with one of the gate clock signals GCK1 to GCK8 as the third clock signal CK3. In the present embodiment, as illustrated in FIG. 4, the unit circuit 2 (*n*) at the n-th stage is applied with the gate clock signal GCK7 as the third clock signal CK3. The input terminal 26 is applied with the low level direct current power supply voltage VSS. An output signal Q(n) is output from the output terminal 29. The output signal Q(n) is applied as a scanning signal GOUT(n) to the corresponding gate bus line GL(n).

Next, a connection relationship between the components in the unit circuit 2 will be described. A second conduction terminal of the thin film transistor T1, a first conduction terminal of the thin film transistor T2, a control terminal of the thin film transistor T6, a control terminal of the thin film transistor T7, a control terminal of the thin film transistor T8, a first conduction terminal of the thin film transistor T9, and one end of the capacitor C are connected to each other via a first node N1. A second conduction terminal of the thin film transistor T4, a first conduction terminal of the thin film transistor T7, a control terminal of the thin film transistor T9, and a control terminal of the thin film transistor T10 are connected to each other via a second node N2. A second conduction terminal of the thin film transistor T3, a control terminal of the thin film transistor T4, a first conduction terminal of the thin film transistor T5 and a first conduction terminal of the thin film transistor T6 are connected to each other via a third node N3.

As for the thin film transistor T1, a control terminal and a first conduction terminal thereof are connected to the input terminal 21, and the second conduction terminal thereof is connected to the first node N1. As for the thin film transistor T2, a control terminal thereof is connected to the input terminal 22, the first conduction terminal thereof is connected to the first node N1, and a second conduction terminal thereof is connected to the input terminal 26. As for the thin film transistor T3, a control terminal and a first conduction terminal thereof are connected to the input terminal 24, and the second conduction terminal thereof is connected to the third node N3. As for the thin film transistor T4, the control terminal thereof is connected to the third node N3, a first conduction terminal thereof is connected to the input terminal 24, and the second conduction terminal thereof is connected to the second node N2. As for the thin film transistor T5, a control terminal thereof is connected to the input terminal 25, the first conduction terminal thereof is connected to the third node N3, and a second conduction terminal thereof is connected to the input terminal 26. As for the thin film transistor T6, the control terminal thereof is connected to the first node N1, the first conduction terminal thereof is connected to third node N3, and a second conduction terminal thereof is connected to the input terminal 26. As for the thin film transistor T7, the control terminal thereof is connected to the first node N1, the first conduction terminal thereof is connected to the second node N2, and a second conduction terminal thereof is connected to the input terminal 26. As for the thin film transistor T8, the control terminal thereof is connected to the first node N1, a first conduction terminal thereof is connected to the input terminal 23, and a second conduction terminal thereof is connected to the output terminal 29. Note that the thin film transistor T8 is referred to as a "buffer transistor". As for the thin film transistor T9, the control terminal thereof is connected to the second node N2, the first conduction terminal thereof is connected to the first node N1, and a second conduction terminal thereof is connected to the input terminal 26. As for the thin film transistor T10, the control terminal thereof is connected to the second node N2, a first conduction terminal thereof is connected to the output terminal 29, and a second conduction terminal thereof is connected to the input terminal 26. As for the capacitor C, one end thereof is connected to the first node N1, and the other end thereof is connected to the output terminal 29.

The unit circuit 2 includes, as functions, a first node pull-up unit 201 configured to change the potential of the first node N1 toward the high level (on level) based on the output signal Q output from the output terminal 29 of a unit circuit 2 constituting a stage before the present stage, a first first node pull-down unit 202 configured to change the potential of the first node N1 toward the low level (off level) based on the output signal Q output from the output terminal 29 of a unit circuit 2 constituting a stage after the present stage, a stabilization circuit 203 configured to reliably maintain the potential of the output terminal 29 at the low level during the non-select period, an output control unit 204 configured to apply the potential of the first clock signal CK1 to the output terminal 29 based on the potential of the first node N1, a second first node pull-down unit 205 configured to change the potential of the first node N1 toward the low level based on the potential of the second node N2, and an output pull-down unit 206 configured to change the potential of the output terminal 29 toward the low level based on the potential of the second node N2. The first node pull-up unit 201 includes the thin film transistor T1. The first first node pull-down unit 202 includes the thin film transistor T2. The stabilization circuit 203 includes the thin film transistors T3 to T7. The output control unit 204 includes the thin film transistor T8. The second first node pull-down unit 205 includes the thin film transistor T9. The output pull-down unit 206 includes the thin film transistor T10.

Next, functions of the respective components (the thin film transistors T1 to T10 and the capacitor C) will be described. The thin film transistor T1 changes the potential of the first node N1 toward the high level when the set signal S is at the high level. The thin film transistor T2 changes the potential of the first node N1 toward the low level when the reset signal R is at the high level. The thin film transistor T3 changes the potential of the third node N3 toward the high level when the second clock signal CK2 is at the high level. The thin film transistor T4 controls the potential of the second node N2 according to the level of the second clock signal CK2 when the potential of the third node N3 is at the high level. The thin film transistor T5 changes the potential of the third node N3 toward the low level when the third clock signal CK3 is at the high level. The thin film transistor T6 changes the potential of the third node N3 toward the low level when the potential of the first node N1 is at the high level. The thin film transistor T7 changes the potential of the second node N2 toward the low level when the potential of the first node N1 is at the high level. The thin film transistor T8 applies the potential of the first clock signal CK1 to the output terminal 29 when the potential of the first node N1 is at the high level. The thin film transistor T9 changes the potential of the first node N1 toward the low level when the potential of the second node N2 is at the high level. The thin film transistor T10 changes the potential of the output terminal 29 toward the low level when the potential of the second node N2 is at the high level. The capacitor C functions as a boost capacitance for increasing the potential of the first node N1.

Note that, in the present embodiment, a first node pull-up transistor is achieved by the thin film transistor T1, a first first node pull-down transistor is achieved by the thin film transistor T2, a third node pull-up transistor is achieved by the thin film transistor T3, a second node pull-up transistor is achieved by the thin film transistor T4, a second third node pull-down transistor is achieved by the thin film transistor T5, a first third node pull-down transistor is achieved by the thin film transistor T6, a first second node pull-down transistor is achieved by the thin film transistor T7, a first output control transistor is achieved by the thin film transistor T8, a second first node pull-down transistor serving as a stabilization transistor is achieved by the thin film transistor T9, a first output node pull-down transistor serving as a stabilization transistor is achieved by the thin film transistor T10, and a first output node is achieved by the output terminal 29.

2.3 Operations of Unit Circuit

Figure 9:
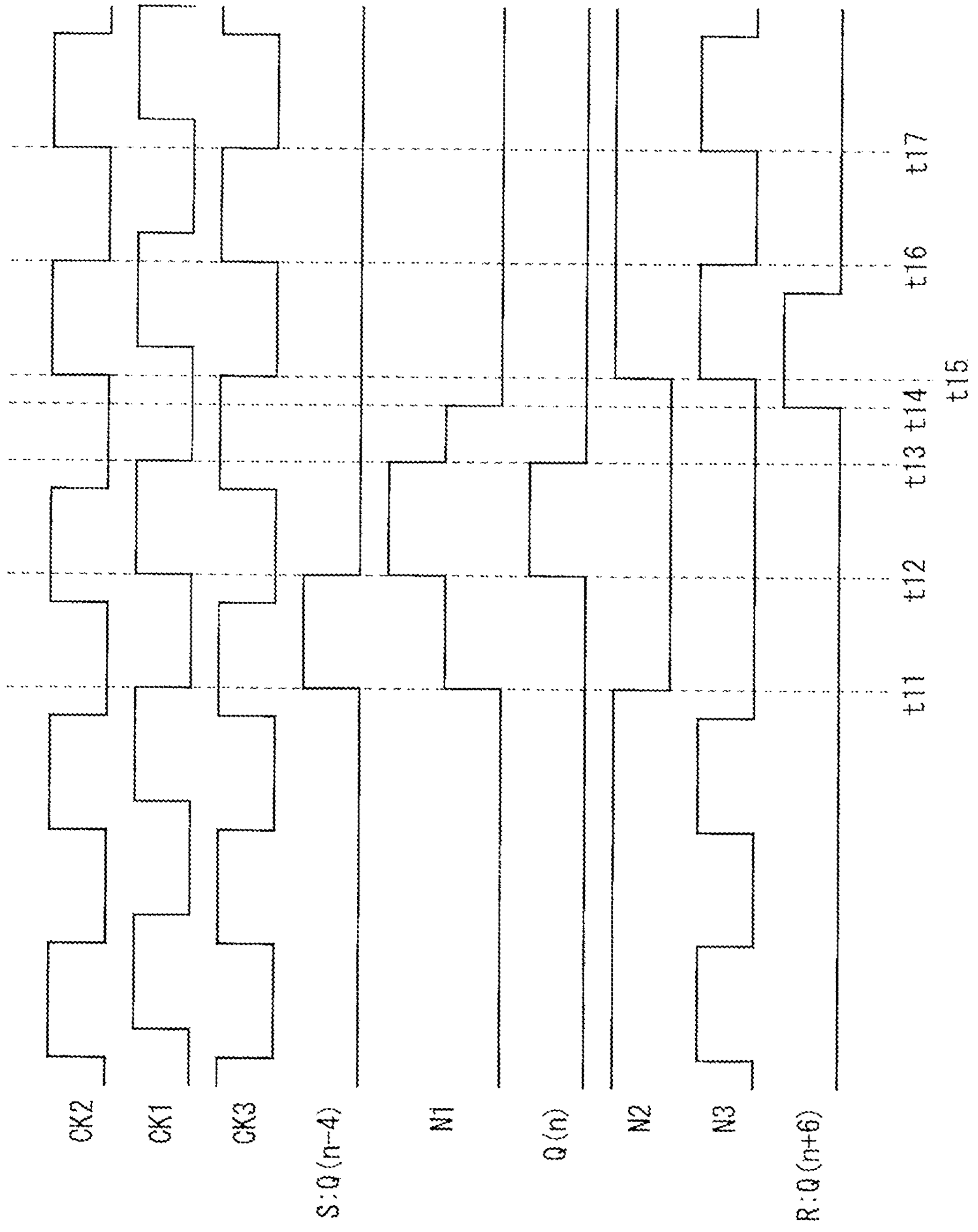
FIG. 9 is waveform diagrams for describing operations of the unit circuit in the embodiment.

Next, operations of the unit circuit 2 will be described with reference to signal waveform diagrams illustrated in FIG. 9. During a period when the liquid crystal display device is operating, the unit circuit 2 is applied with the first to third clock signals CK1 to CK3 each having a duty ratio of approximately 50%. As described above, the phase of the second clock signal CK2 is advanced by 45 degrees from the phase of the first clock signal CK1, and the phase of the third clock signal CK3 is delayed by 135 degrees from the phase of the first clock signal CK1. Note that here, the unit circuit 2 (*n*) at the n-th stage is focused on.

At time immediately before time t1*l*, the set signal S is at the low level, the output signal Q(n) is at the low level, the reset signal R is at the low level, the potential of the first node N1 is at the low level, the potential of the second node N2 is at the high level, and the potential of the third node N3 is at the low level.

At the time t1*l*, the set signal S changes from the low level to the high level. Since the thin film transistor T1 is diode-connected as illustrated in FIG. 1, a pulse of the set signal S sets the thin film transistor T1 to be in the on state, so that the potential of the first node N1 rises. As a result, the thin film transistors T6, T7, and T8 are set to be in the on state. By setting the thin film transistor T7 to be in the on state, the potential of the second node N2 is set to be at the low level. Note that, in the period from the time t11 to time t12, the first clock signal CK1 is at the low level, and thus, even when the thin film transistor T8 is set to be in the on state, the output signal Q(n) is maintained at the low level. As will be described later, the potential of the first node N1 is maintained at the high level until time t14. That is, in the period from the time t11 to the time t14, the potential of the first node N1 is maintained at the high level. Thus, during this period, the thin film transistor T7 and the thin film transistor T6 are maintained in the on state, and the potential of the third node N3 and the potential of the second node N2 are maintained at the low level.

At the time t12, the first clock signal CK1 changes from the low level to the high level. At this time, since the thin film transistor T8 is in the on state, the potential of the output terminal 29 rises along with rise of a potential of the input terminal 23. Here, since the capacitor C is provided between the first node N1 and the output terminal 29 as illustrated in FIG. 1, the potential of the first node N1 also rises along with the rise of the potential of the output terminal 29 (the first node N1 is set to be in a boost state). As a result, a large voltage is applied to the control terminal of the thin film transistor T8, and the potential of the output signal Q(n) rises up to a level sufficient to cause the gate bus line GL(n) connected to the output terminal 29 to be in a select state. Note that, in the period from the time t12 to time t13, the reset signal R is maintained at the low level, and the potential of the second node N2 is also maintained at the low level. Thus, during this period, the thin film transistor T2 and the thin film transistor T10 are maintained in the off state, so that the potential of the first node N1 and the potential of the output signal Q(n) (the potential of the output terminal 29) do not fall.

At the time t13, the first clock signal CK1 changes from the high level to the low level. As a result, the potential of the output terminal 29 falls along with fall of the potential of the input terminal 23. That is, the potential of the output signal Q(n) is set to be at the low level. The potential of the first node N1 falls via the capacitor C.

At the time t14, the reset signal R changes from the low level to the high level. As a result, the thin film transistor T2 is set to be in the on state, and the potential of the first node N1 is set to be at the low level. By setting the potential of the first node N1 to be at the low level, the thin film transistors T6, T7, and T8 are set to be in the off state.

At time t15, the second clock signal CK2 changes from the low level to the high level. As a result, the thin film transistor T3 is set to be in the on state. At the time t15, the third clock signal CK3 changes from the high level to the low level. As a result, the thin film transistor T5 is set to be in the off state. At this time, the thin film transistor T6 is in the off state. As described above, at the time t15, the potential of the third node N3 changes from the low level to the high level. As a result, the thin film transistor T4 is set to be in the on state. At this time, the thin film transistor T7 is in the off state. Thus, at the time t15, the potential of the second node N2 changes from the low level to the high level.

At time t16, the second clock signal CK2 changes from the high level to the low level, and the third clock signal CK3 changes from the low level to the high level. As described above, at the timing when the second clock signal CK2 applied to the control terminal of the thin film transistor T3 changes from the high level (on level) to the low level (off level), the third clock signal CK3 applied to the control terminal of the thin film transistor T5 changes from the low level (off level) to the high level (on level). As a result, the thin film transistor T3 is set to be in the off state, and the thin film transistor T5 is set to be in the on state. As described above, at the time t16, the potential of the third node N3 changes from the high level to the low level. At this time, the thin film transistor T4 is set to be in the off state, and thus the potential of the second node N2 is maintained at the high level.

At time t17, the second clock signal CK2 changes from the low level to the high level. As a result, the thin film transistor T3 is set to be in the on state. At the time t17, the third clock signal CK3 changes from the high level to the low level. As a result, the thin film transistor T5 is set to be in the off state. At this time, the thin film transistor T6 is in the off state. As described above, at the time t17, the potential of the third node N3 changes from the low level to the high level. As a result, the thin film transistor T4 is set to be in the on state, and charges are supplied to the second node N2 from the input terminal 24. Thus, even when the leakage of the charges occurs in the thin film transistor T7 and/or T9, the potential of the second node N2 is maintained at the high level.

In the non-select period, as described above, the potential of the third node N3 repeats the change from the low level to the high level and the change from the high level to the low level, and the potential of the second node N2 is maintained at the high level. As a result, throughout the non-select period, the potential of the first node N1 and the potential of the output signal Q(n) (the potential of the output terminal 29) are maintained at the low level.

Such operations are performed in each unit circuit 2, thus the plurality of (i) gate bus lines GL(1) to GL(i) provided in the liquid crystal display device are sequentially set to be in the select state, and the image signals are sequentially written into the pixel capacitances 46. As a result, an image based on the image signal DAT transmitted from the outside is displayed on the display portion 400 (see FIG. 2).

Note that, although the eight-phase clock signals are used as the gate clock signals GCK in the present embodiment, the number of phases of the gate clock signal GCK is not particularly limited thereto as described above. In this regard, for example, when P-phase clock signals are used, where P is a natural number, the control terminal of the thin film transistor T3 is applied with a clock signal whose phase is advanced by (360/P) degrees from a phase of a clock signal applied to the first conduction terminal of the thin film transistor T8.

2.4 Transistor Size and Wiring Line

Here, the sizes of the thin film transistors in the unit circuit 2 illustrated in FIG. 1 and wiring lines to the gate driver 200 will be described.

The thin film transistor T3 is an element for charging the third node N3. When the potential of the first node N1 is maintained at the high level in the select period, the potential of the third node N3 is desirably at the low level. The channel length of the thin film transistor T3 is made longer than the channel lengths of the other thin film transistors, so that the pull-down effect of the thin film transistor T6 is larger than the pull-up effect of the thin film transistor T3 when the thin film transistor T3 serving as the pull-up transistor of the third node N3 and the thin film transistor T6 serving as the pull-down transistor of the third node N3 are simultaneously in the on state. The channel width of the thin film transistor T3 is the same as the channel widths of the thin film transistors T4 and T5.

Since the potential of the second node N2 is maintained at the high level throughout the non-select period as described above (see FIG. 9), the level of the charging capability of the thin film transistor T4 is not particularly limited. The thin film transistor T5 is an element for discharging the third node N3, but does not need to have a high discharging capability. As described above, in order to reduce the circuit area, the thin film transistor T4 and the thin film transistor T5 have the minimum size among the thin film transistors T1 to T10 provided in the unit circuit 2.

Figure 10:
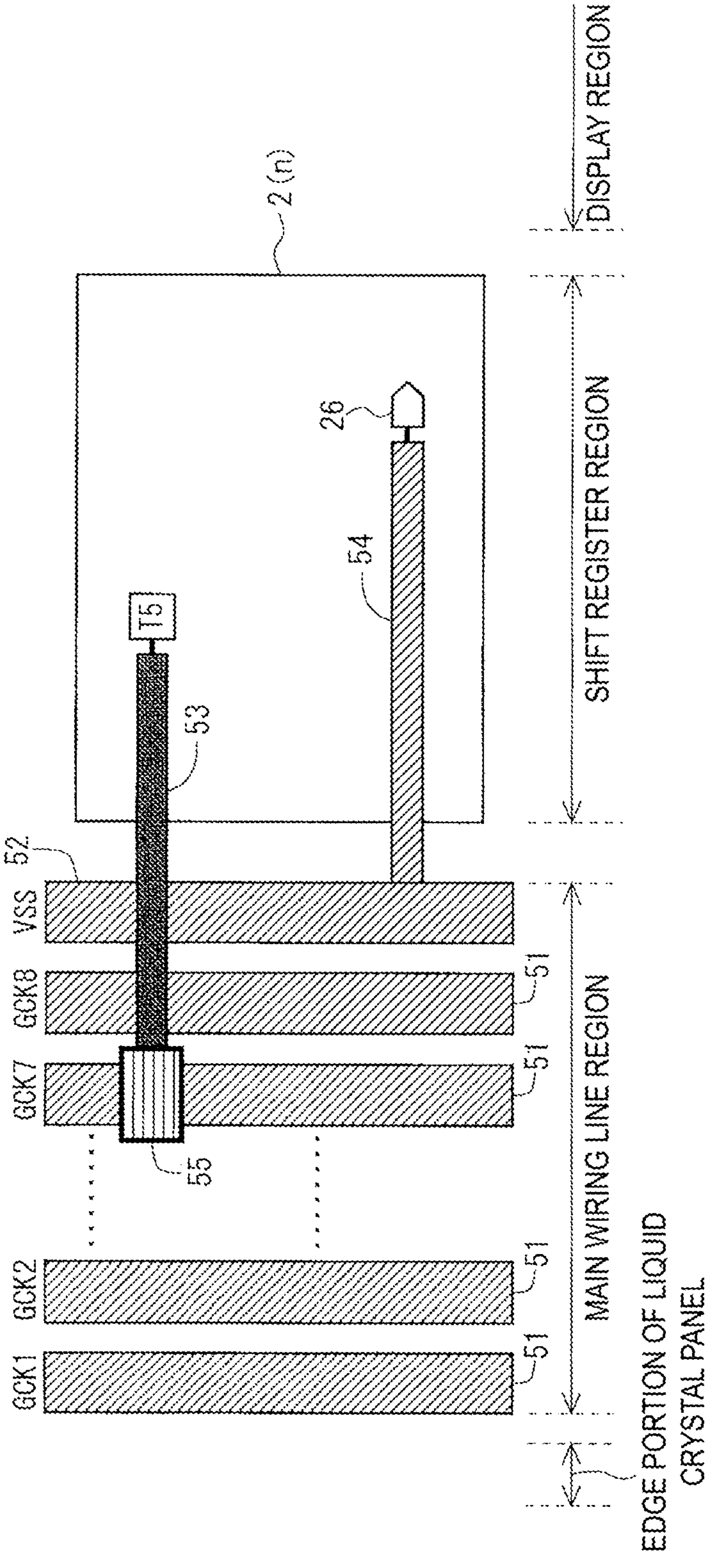
FIG. 10 is a diagram for describing a layout in the embodiment.

As schematically illustrated in FIG. 10, a region on the active matrix substrate constituting the liquid crystal panel 5 includes a display region in which the plurality of (i×j) pixel forming sections 4 are formed, a shift register region in which the shift register 210 is formed, and a main wiring line region in which clock signal main wiring lines 51 each transmitting a respective one of the gate clock signals GCK1 to GCK8 and a power supply voltage main wiring line 52 transmitting the low level direct current power supply voltage VSS are formed. The clock signal main wiring lines 51 and the power supply voltage main wiring line 52 are formed of a source metal (a metal film forming the source bus lines SL). Here, as illustrated in FIG. 10, a clock signal branch wiring line 53 including one end connected to one of the plurality of clock signal main wiring lines 51 and the other end connected to the control terminal of the thin film transistor T5 is provided as a wiring line for applying the gate clock signal GCK to the control terminal of the thin film transistor T5. The clock signal branch wiring line 53 is formed of a gate metal (a metal film forming the gate bus lines GL). Note that the clock signal branch wiring line 53 is connected to one of the plurality of clock signal main wiring lines 51 via a contact hole 55 in the main wiring line region. As illustrated in FIG. 10, a power supply voltage branch wiring line 54 including one end connected to the power supply voltage main wiring line 52 and the other end connected to the input terminal 26 is provided as a wiring line for applying the low level direct current power supply voltage VSS to the input terminal 26 of the unit circuit 2. The power supply voltage branch wiring line 54 is formed of the source metal.

Figure 11:
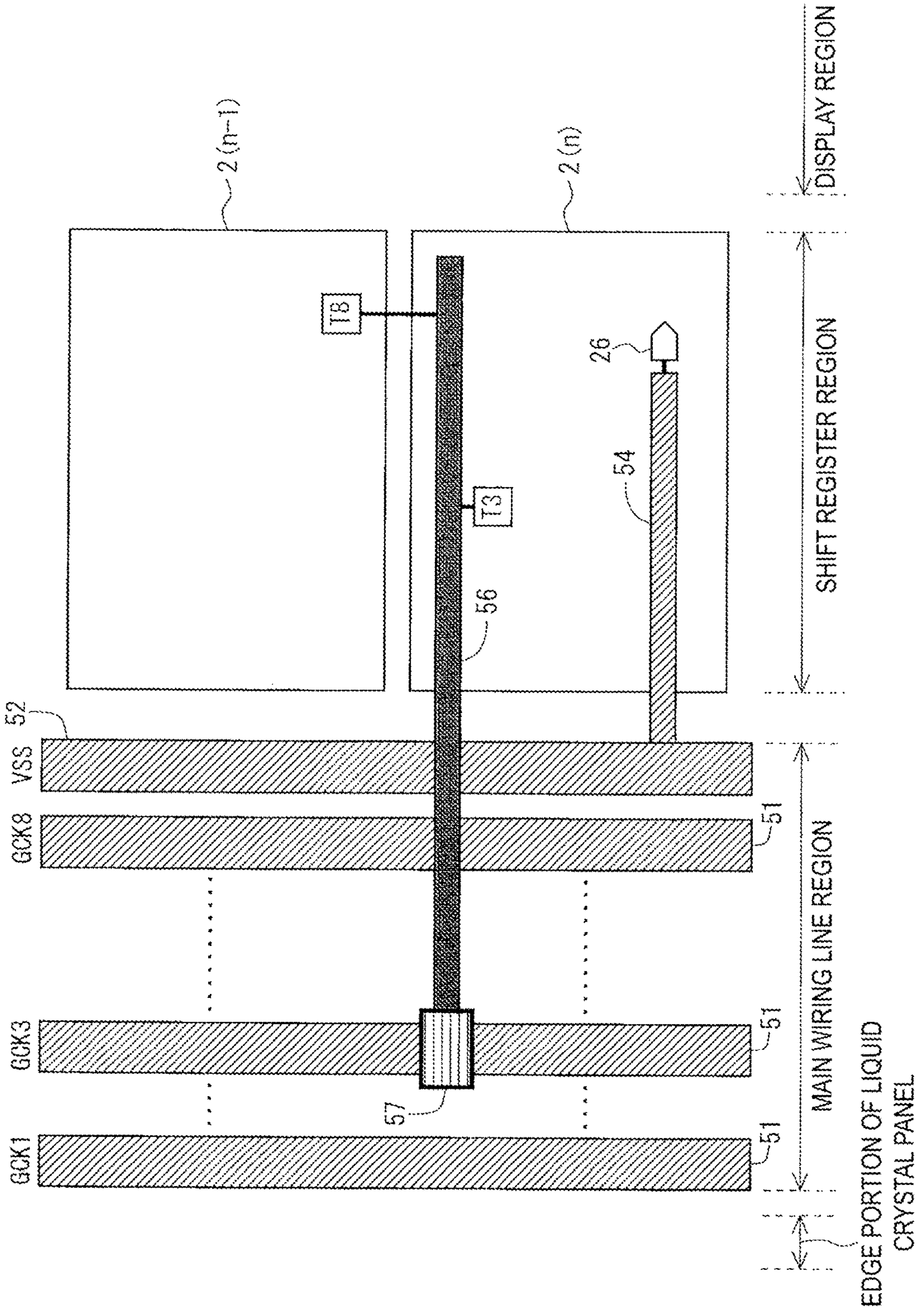
FIG. 11 is a diagram for describing a layout in the embodiment.

As described above, the phase of the second clock signal CK2 is advanced by 45 degrees from the phase of the first clock signal CK1. Thus, for example, a gate clock signal GCK applied as the second clock signal CK2 to the control terminal and the first conduction terminal of the thin film transistor T3 included in the unit circuit 2 (*n*) at the n-th stage and a gate clock signal GCK applied as the first clock signal CK1 to the first conduction terminal of the thin film transistor T8 included in the unit circuit 2(*n*−1) at the (n−1)-th stage are the same signal. In consideration of this, in the present embodiment, the wiring line (branch wiring line) for applying the gate clock signal GCK to the control terminal and the first conduction terminal of the thin film transistor T3 included in the unit circuit 2 (*n*) at the n-th stage and the wiring line (branch wiring line) for applying the gate clock signal GCK to the first conduction terminal of the thin film transistor T8 included in the unit circuit 2 (n−1) at the (n−1)-th stage are achieved by one wiring line (branch wiring line). Specifically, as schematically illustrated in FIG. 11, the first conduction terminal of the thin film transistor T8 included in the unit circuit 2 (n−1) at the (n−1)-th stage and the control terminal and the first conduction terminal of the thin film transistor T3 included in the unit circuit 2(*n*) at the n-th stage are connected to the same clock signal branch wiring line 56 including one end connected to one of the plurality of clock signal main wiring lines 51. Note that the clock signal branch wiring line 56 is formed of the gate metal and is connected to one of the plurality of clock signal main wiring lines 51 via a contact hole 57 in the main wiring line region.

In the present embodiment, the increase of the circuit area is suppressed by adopting layouts illustrated in FIG. 10 and FIG. 11. Note that a first metal film is achieved by the source metal, and a second metal film is achieved by the gate metal.

3. Advantageous Effects

According to the present embodiment, the unit circuit 2 constituting each of the stages of the shift register 210 in the gate driver 200 is provided with the thin film transistor T5 including the control terminal applied with one of the plurality of gate clock signals GCK, the first conduction terminal connected to the third node N3, and the second conduction terminal applied with the low level direct current power supply voltage VSS. The gate clock signal GCK (second clock signal CK2) applied to the control terminal and first conduction terminal of the thin film transistor T3 and the gate clock signal GCK (third clock signal CK3) applied to the control terminal of the thin film transistor T5 are shifted to each other by 180 degrees in phase. Thus, during the non-select period, the potential of the third node N3 repeats the change from the low level to the high level and the change from the high level to the low level. The third clock signal CK3 changes from the low level to the high level at a timing when the second clock signal CK2 changes from the high level to the low level, and thus the potential of the third node N3 is at the low level in the period when the second clock signal CK2 is at the low level, and the thin film transistor T4 is maintained in the off state. As described above, the potential of the second node N2 is maintained at the high level throughout the non-select period. That is, excessive charging and discharging of the second node N2 is suppressed. As a result, the power consumption is reduced. Since the thin film transistors T9 and T10 are prevented from repeating the change from the on state to the off state and the change from the off state to the on state during the non-select period, deterioration of the thin film transistors T9 and T10 is suppressed. As a result, a pull-down function for pulling the potential of the first node N1 to the low level and a pull-down function for pulling the potential of the output terminal 29 to the low level are stabilized. As described above, according to the present embodiment, the reduction of the power consumption and the stabilization of the operations of the gate driver 200 (monolithic gate driver) are achieved.

4. Modified Example

Modified examples of the configuration of the unit circuit 2 will be described below.

4.1 First Modified Example

Figure 12:
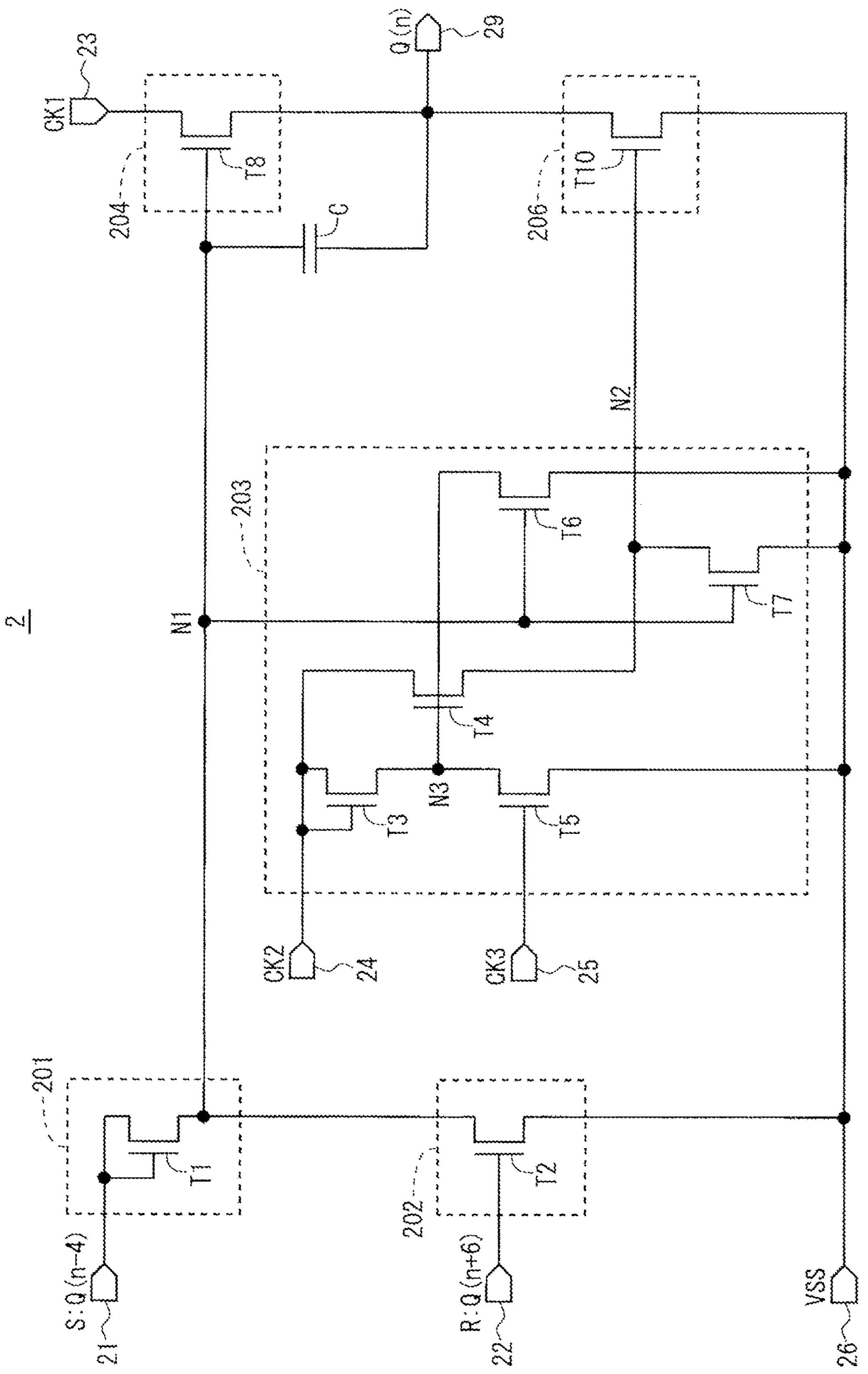
FIG. 12 is a circuit diagram illustrating a configuration of a unit circuit (configuration of one stage of a shift register) in a first modified example of the embodiment.

FIG. 12 is a circuit diagram illustrating a configuration of the unit circuit 2 according to a first modified example of the above embodiment. The unit circuit 2 in the present modified example is not provided with the thin film transistor T9 unlike the unit circuit 2 in the above embodiment (see FIG. 1). As described above, since the thin film transistor T9 is not provided, even when noise is generated at the first node N1 as a result of a clock operation and/or the like of the first clock signal CK1 during the non-select period, the potential of the first node N1 is not pulled to the low level. Thus, the potential of the first node N1 during the non-select period may be unstable. However, since the thin film transistor T9 is not provided, an effect that the circuit area can be reduced as compared with the above embodiment can be obtained.

4.2 Second Modified Example

Figure 13:
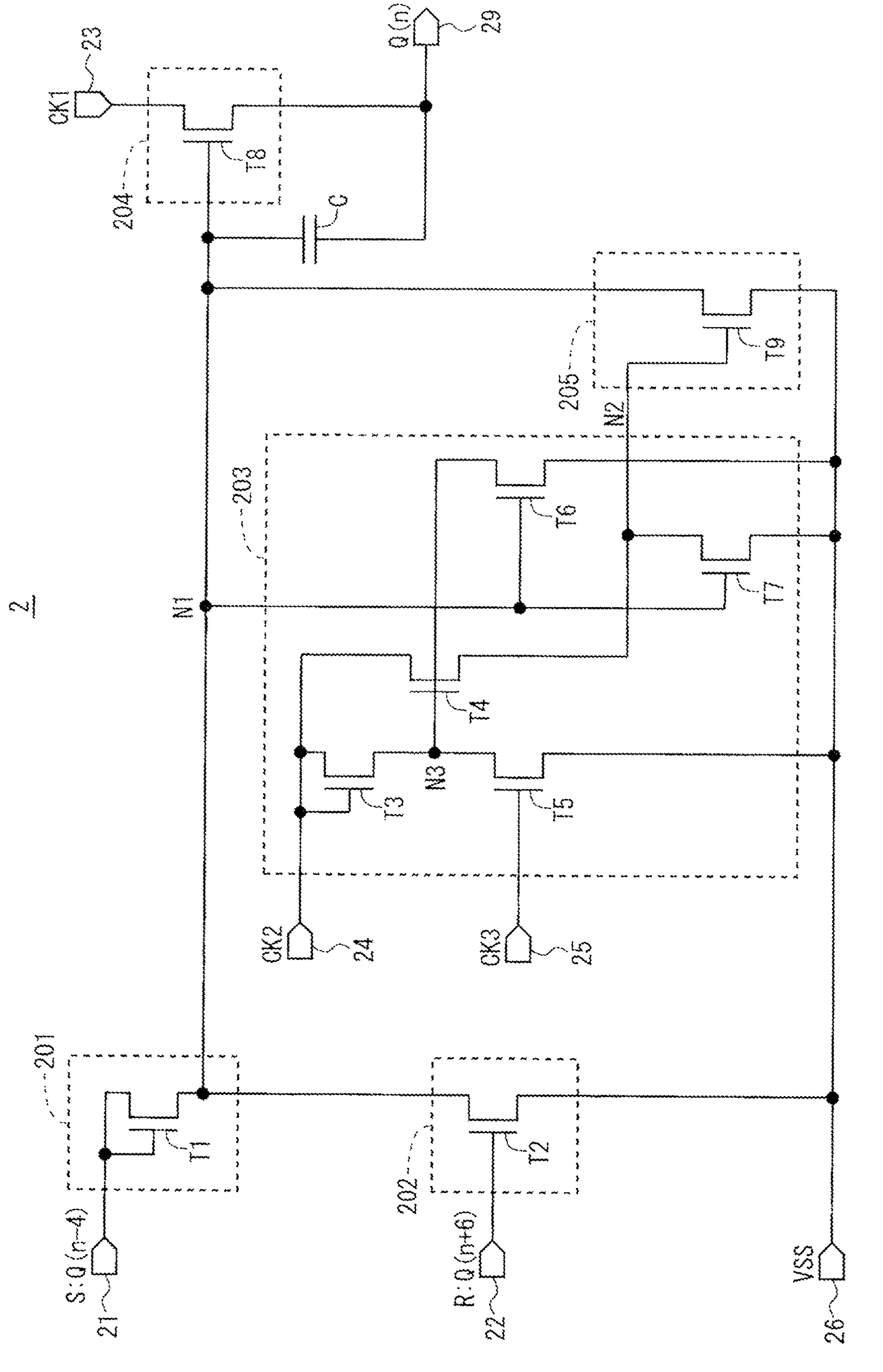
FIG. 13 is a circuit diagram illustrating a configuration of a unit circuit (configuration of one stage of a shift register) in a second modified example of the embodiment.

FIG. 13 is a circuit diagram illustrating a configuration of the unit circuit 2 according to a second modified example of the above embodiment. The unit circuit 2 in the present modified example is not provided with the thin film transistor T10 unlike the unit circuit 2 in the above embodiment (see FIG. 1). As described above, since the thin film transistor T10 is not provided, even when the potential of the output terminal 29 fluctuates due to, for example, noise during the non-select period, the potential of the output terminal 29 is not pulled to the low level. Thus, the potential of the output terminal 29 (potential of the output signal Q) during the non-select period may be unstable. However, since the thin film transistor T10 is not provided, an effect that the circuit area can be reduced as compared with the above embodiment can be obtained.

4.3 Third Modified Example

Figure 14:
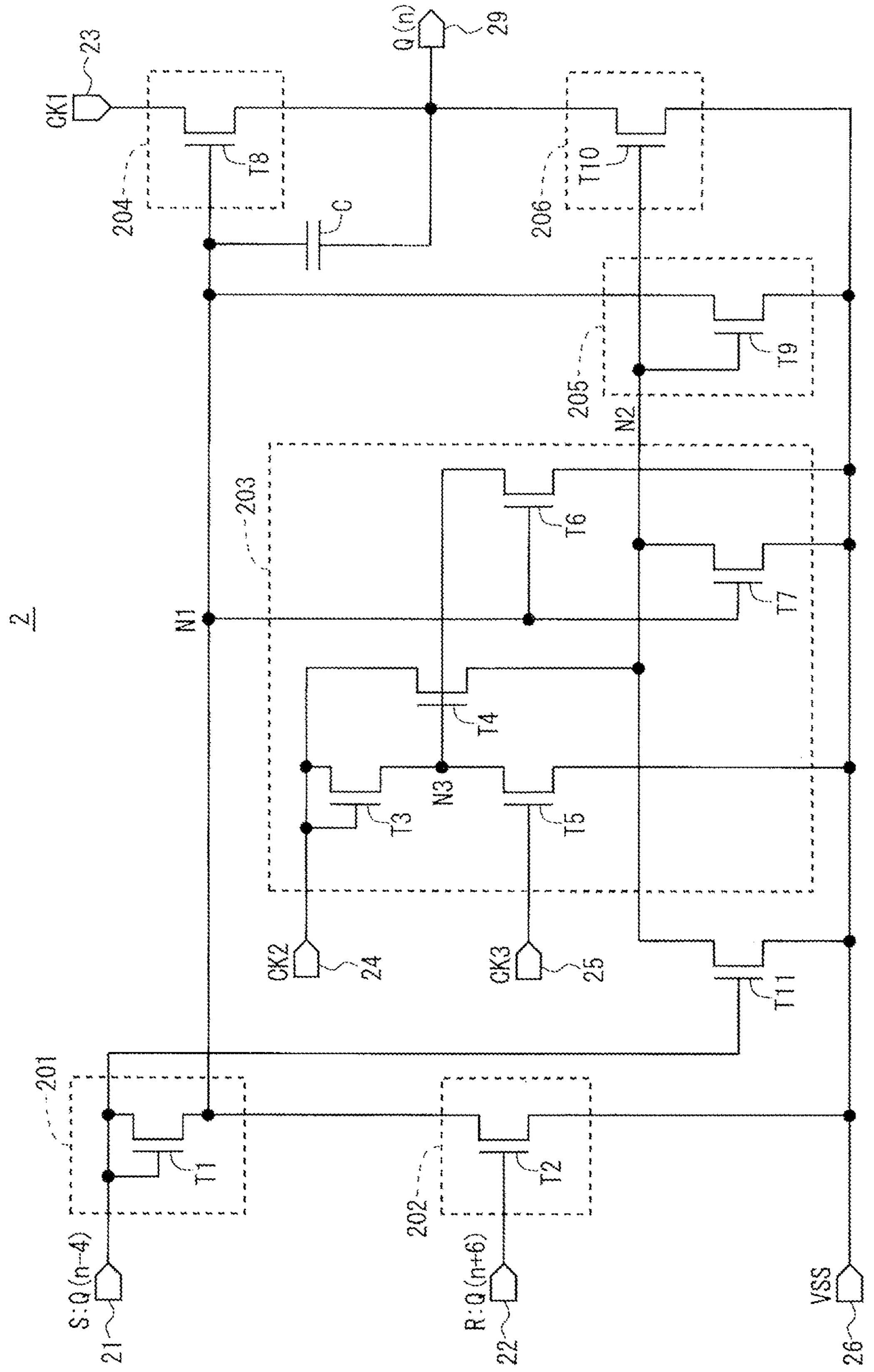
FIG. 14 is a circuit diagram illustrating a configuration of a unit circuit (configuration of one stage of a shift register) in a third modified example of the embodiment.

FIG. 14 is a circuit diagram illustrating a configuration of the unit circuit 2 according to a third modified example of the above embodiment. The unit circuit 2 in the present modified example is provided with a thin film transistor T1*l* in addition to the components of the unit circuit 2 in the above embodiment (see FIG. 1). As for the thin film transistor T1*l*, a control terminal thereof is connected to the input terminal 21, a first conduction terminal thereof is connected to the second node N2, and a second conduction terminal thereof is connected to the input terminal 26. The thin film transistor T1*l* changes the potential of the second node N2 toward the low level when the set signal S is at the high level. Note that a second second node pull-down transistor is achieved by the thin film transistor T11.

According to the present modified example, charges of the second node N2 is discharged via the thin film transistor T7 and the thin film transistor T1*l*. Thus, at the time t1*l* in FIG. 9, the potential of the second node N2 is reliably pulled from the high level to the low level. As a result, the operation of the gate driver 200 is further stabilized.

4.4 Fourth Modified Example

Figure 15:
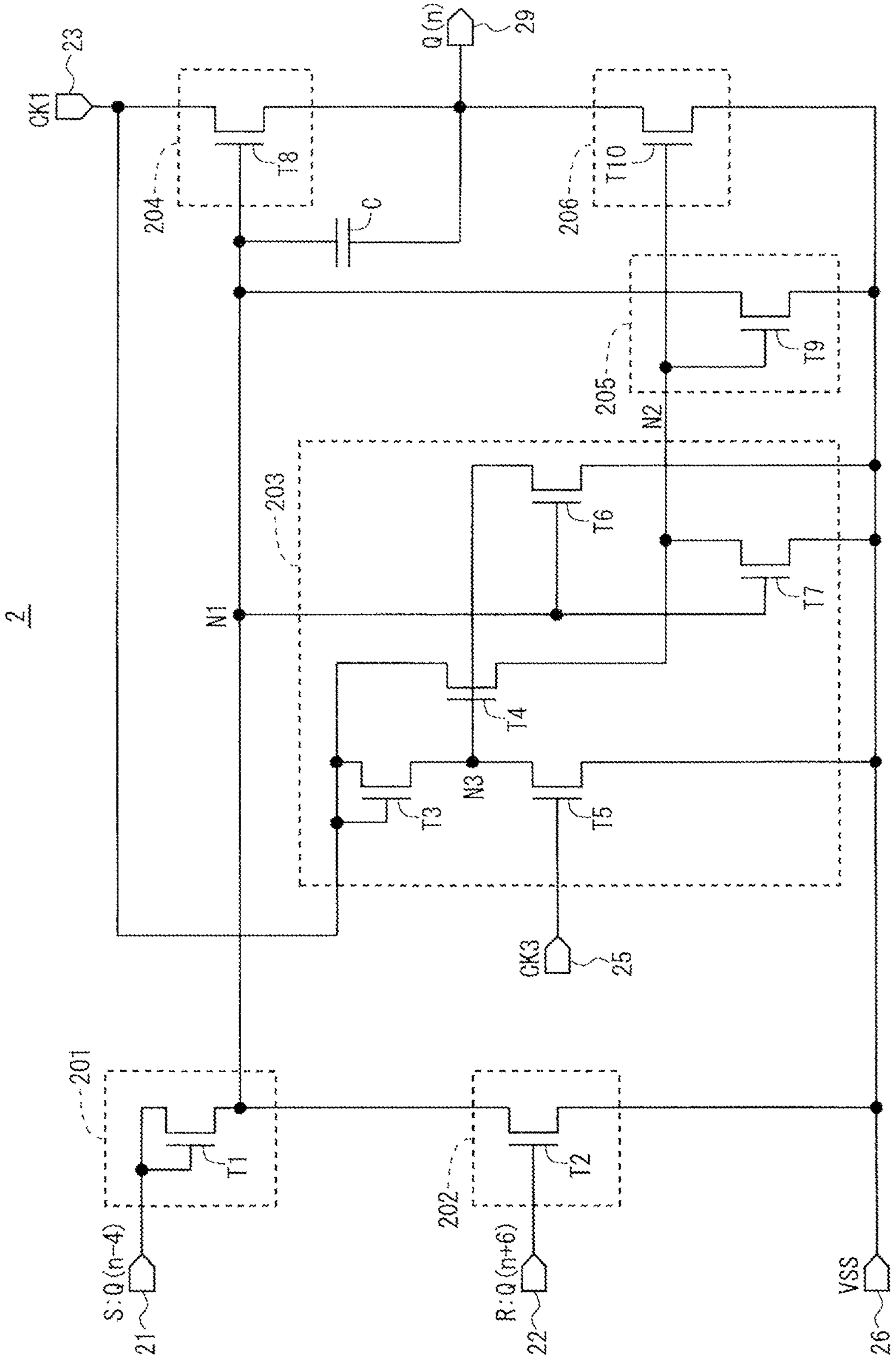
FIG. 15 is a circuit diagram illustrating a configuration of a unit circuit (configuration of one stage of a shift register) in a fourth modified example of the embodiment.

FIG. 15 is a circuit diagram illustrating a configuration of the unit circuit 2 according to a fourth modified example of the above embodiment. In the present modified example, the control terminal and the first conduction terminal of the thin film transistor T3 are connected to the input terminal 23. Thus, the unit circuit 2 is not provided with the input terminal 24. The control terminal and the first conduction terminal of the thin film transistor T3 and the first conduction terminal of the thin film transistor T8 are applied with, as the first clock signal CK1, the same gate clock signal. As will be described later, at a timing when the first clock signal CK1 applied to the control terminal of the thin film transistor T3 changes from the high level to the low level, the third clock signal CK3 applied to the control terminal of the thin film transistor T5 changes from the low level to the high level. In this regard, for example, the duty ratio of each clock signal is 50%, and the phase of the third clock signal CK3 is delayed by 180 degrees from the phase of the first clock signal CK1 (see FIG. 16).

Figure 16:
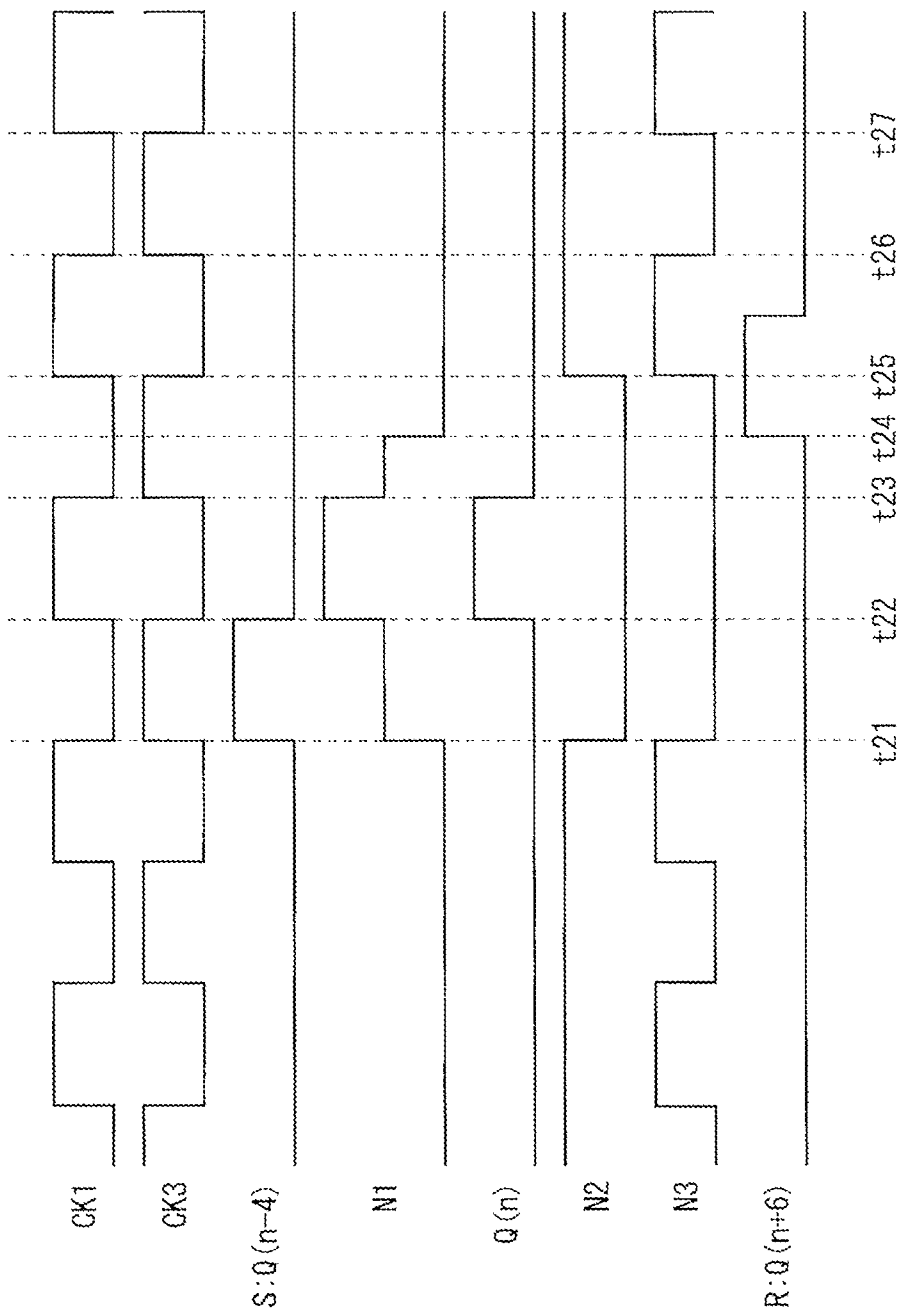
FIG. 16 is waveform diagrams for describing operations of the unit circuit in the fourth modified example of the embodiment.

Operations of the unit circuit 2 according to the present modified example will be described with reference to FIG. 16. Note that, also here, the unit circuit 2 (*n*) at the n-th stage is focused on. At time immediately before time t21, the set signal S is at the low level, the output signal Q (n) is at the low level, the reset signal R is at the low level, the potential of the first node N1 is at the low level, the potential of the second node N2 is at the high level, and the potential of the third node N3 is at the high level.

At the time t21, the set signal S changes from the low level to the high level. As a result, similarly to the time t1*l* in the above embodiment (see FIG. 9), the potential of the first node N1 rises and the potential of the second node N2 is set to be at the low level. At the time t21, the first clock signal CK1 changes from the high level to the low level, and the third clock signal CK3 changes from the low level to the high level. Thus, the thin film transistor T3 is set to be in the off state, and the thin film transistor T5 is set to be in the on state. As a result, the potential of the third node N3 is set to be at the low level. At time t22, time t23, and time t24, operations are performed similarly to the operations at the time t12, the time t13, and the time t14 in the above embodiment.

At time t25, the first clock signal CK1 changes from the low level to the high level. As a result, the thin film transistor T3 is set to be in the on state. At the time t25, the third clock signal CK3 changes from the high level to the low level. As a result, the thin film transistor T5 is set to be in the off state. As described above, similarly to the time t15 in the above embodiment, the potential of the third node N3 and the potential of the second node N2 change from the low level to the high level.

At time t26, the first clock signal CK1 changes from the high level to the low level, and the third clock signal CK3 changes from the low level to the high level. As described above, at the timing when the first clock signal CK1 applied to the control terminal of the thin film transistor T3 changes from the high level (on level) to the low level (off level), the third clock signal CK3 applied to the control terminal of the thin film transistor T5 changes from the low level (off level) to the high level (on level). As a result, the thin film transistor T3 is set to be in the off state, and the thin film transistor T5 is set to be in the on state. As described above, at the time t26, the potential of the third node N3 changes from the high level to the low level. At this time, the thin film transistor T4 is set to be in the off state, and thus the potential of the second node N2 is maintained at the high level.

At time t27, the first clock signal CK1 changes from the low level to the high level. As a result, the thin film transistor T3 is set to be in the on state. At the time t27, the third clock signal CK3 changes from the high level to the low level. As a result, the thin film transistor T5 is set to be in the off state. As described above, similarly to the time t17 in the above embodiment, the potential of the third node N3 changes from the low level to the high level, and charges are supplied from the input terminal 24 to the second node N2 via the thin film transistor T4.

As described above, also in the present modified example, the potential of the second node N2 is maintained at the high level in the non-select period. Thus, throughout the non-select period, the potential of the first node N1 and the potential of the output signal Q(n) (the potential of the output terminal 29) are maintained at the low level.

According to the present modified example as described above, the wiring line (branch wiring line) for applying the gate clock signal GCK to the control terminal and the first conduction terminal of the thin film transistor T3 and the wiring line (branch wiring line) for applying the gate clock signal GCK to the first conduction terminal of the thin film transistor T8 can be achieved by one wiring line (branch wiring line). As a result, the effect of reducing the circuit area and an effect of reducing the number of intersections of the wiring lines can be obtained. Note that effects similar to those of the above embodiments can also be obtained.

4.5 Fifth Modified Example

Figure 17:
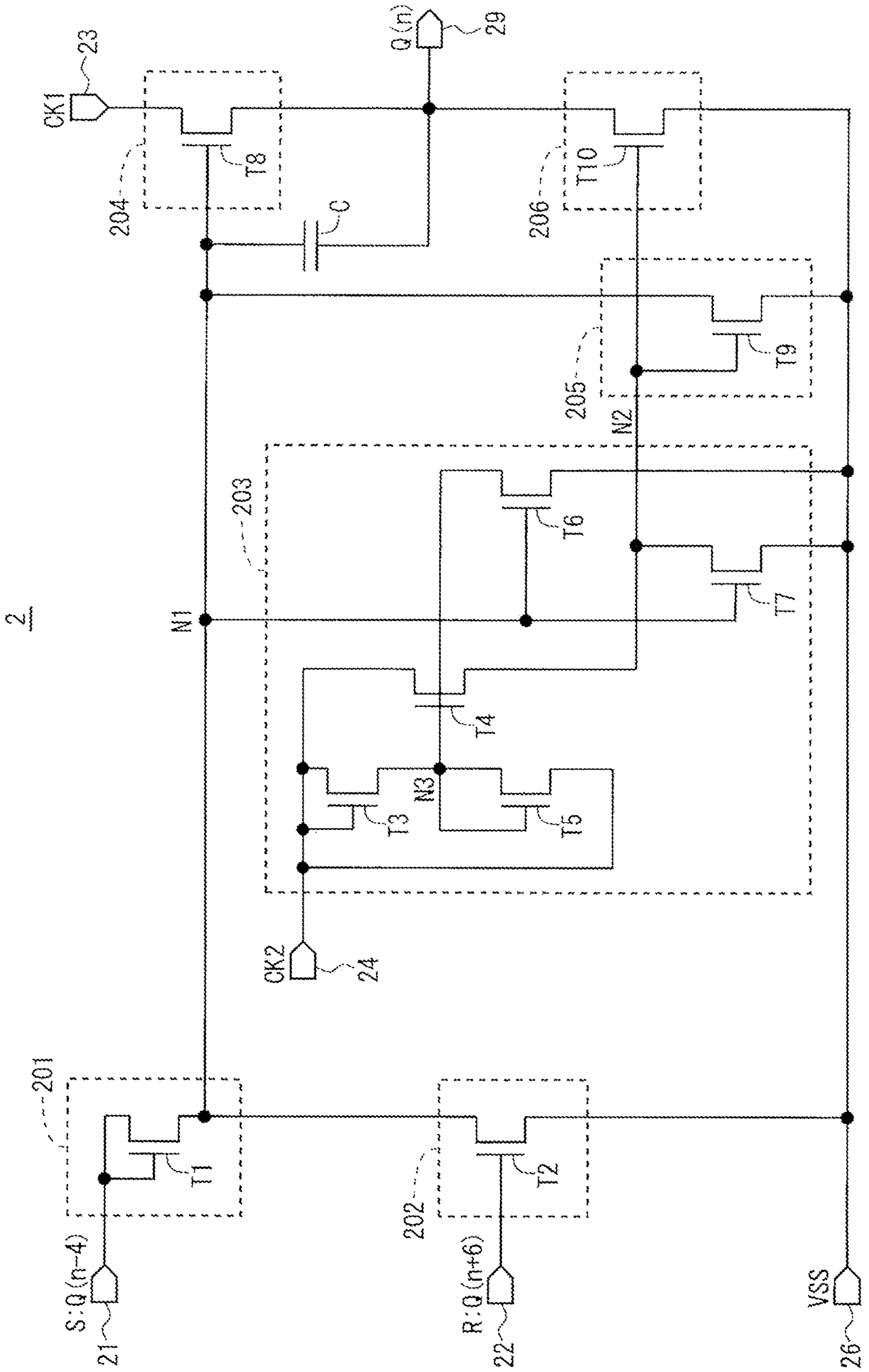
FIG. 17 is a circuit diagram illustrating a configuration of a unit circuit (configuration of one stage of a shift register) in a fifth modified example of the embodiment.

FIG. 17 is a circuit diagram illustrating a configuration of the unit circuit 2 according to a fifth modified example of the above embodiment. In the present modified example, the configuration of the thin film transistor T5 is different from that of the above embodiment. As for the thin film transistor T5 in the present modified example, the control terminal thereof and the first conduction terminal thereof are connected to the third node N3, and the second conduction terminal thereof is connected to the input terminal 24. Thus, the unit circuit 2 is not provided with the input terminal 25. The control terminal and the first conduction terminal of the thin film transistor T3 and the second conduction terminal of the thin film transistor T5 are applied with, as the second clock signal CK2, the same gate clock signal GCK.

Figure 18:
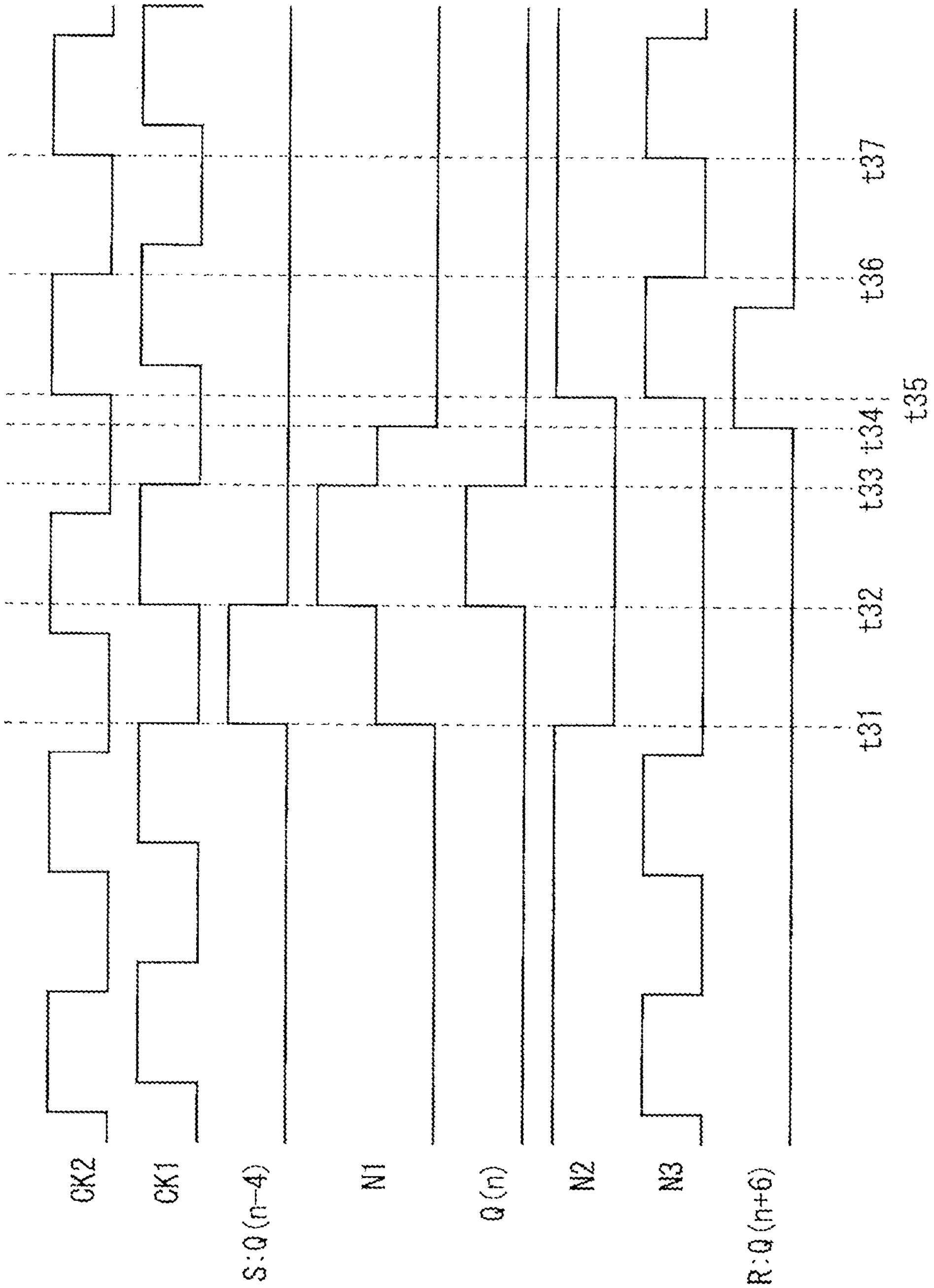
FIG. 18 is waveform diagrams for describing operations of the unit circuit in the fifth modified example of the embodiment.

Operations of the unit circuit 2 according to the present modified example will be described with reference to FIG. 18. Note that, also here, the unit circuit 2(*n*) at the n-th stage is focused on. In a period before time t34, operations similar to those in the period before the time t14 in the above embodiment (see FIG. 9) are performed.

At time t35, the second clock signal CK2 changes from the low level to the high level. As a result, the thin film transistor T3 is set to be in the on state. Since the potential of the second conduction terminal of the thin film transistor T5 rises, the thin film transistor T5 is maintained in the off state. As this time, since the potential of the first node N1 is at the low level, the thin film transistor T6 is in the off state. As described above, at the time t35, the potential of the third node N3 changes from the low level to the high level. As a result, the thin film transistor T4 is set to be in the on state. At this time, the thin film transistor T7 is in the off state. Thus, at the time t35, the potential of the second node N2 changes from the low level to the high level.

At time t36, the second clock signal CK2 changes from the high level to the low level. As a result, the thin film transistor T3 is set to be in the off state. When the potential of the second conduction terminal of the thin film transistor T5 falls, the thin film transistor T5 is set to be in the on state and the potential of the third node N3 falls. As a result, the thin film transistor T4 is set to be in the off state. Thus, the potential of the second node N2 is maintained at the high level.

At time t37, the second clock signal CK2 changes from the low level to the high level. As a result, similarly to the time t35, the potential of the third node N3 changes from the low level to the high level. As a result, the thin film transistor T4 is set to be in the on state. At this time, the thin film transistor T7 is in the off state. As described above, charges are supplied to the second node N2 from the input terminal 24 via the thin film transistor T4.

As described above, also in the present modified example, the potential of the second node N2 is maintained at the high level in the non-select period. Thus, throughout the non-select period, the potential of the first node N1 and the potential of the output signal Q(n) (the potential of the output terminal 29) are maintained at the low level.

According to the present modified example as described above, the wiring line (branch wiring line) for applying the gate clock signal GCK to the control terminal and the first conduction terminal of the thin film transistor T3 and the wiring line (branch wiring line) for applying the gate clock signal GCK to the second conduction terminal of the thin film transistor T5 can be achieved by one wiring line (branch wiring line). As a result, the effect of reducing the circuit area and the effect of reducing the number of intersections of the wiring lines can be obtained. Note that effects similar to those of the above embodiments can also be obtained.

4.6 Sixth Modified Example

In the above embodiment and the above first to fifth modified examples, the output signal from one output terminal 29 is applied as the scanning signal GOUT to the corresponding gate bus line GL, is applied as the reset signal R to the unit circuit 2 at the stage six stages before the present stage, and is applied as the set signal S to the unit circuit 2 at the stage four stages after the present stage. That is, the scanning signal GOUT and a signal for controlling the operations of another stage (hereinafter referred to as "an other-stage control signal" for convenience) are output from the same output terminal 29. However, the disclosure is not limited thereto, and the configuration (configuration of the present modified example) can be adopted in which the scanning signal GOUT and the other-stage control signal are output from different output terminals with respect to the unit circuit 2.

Figure 19:
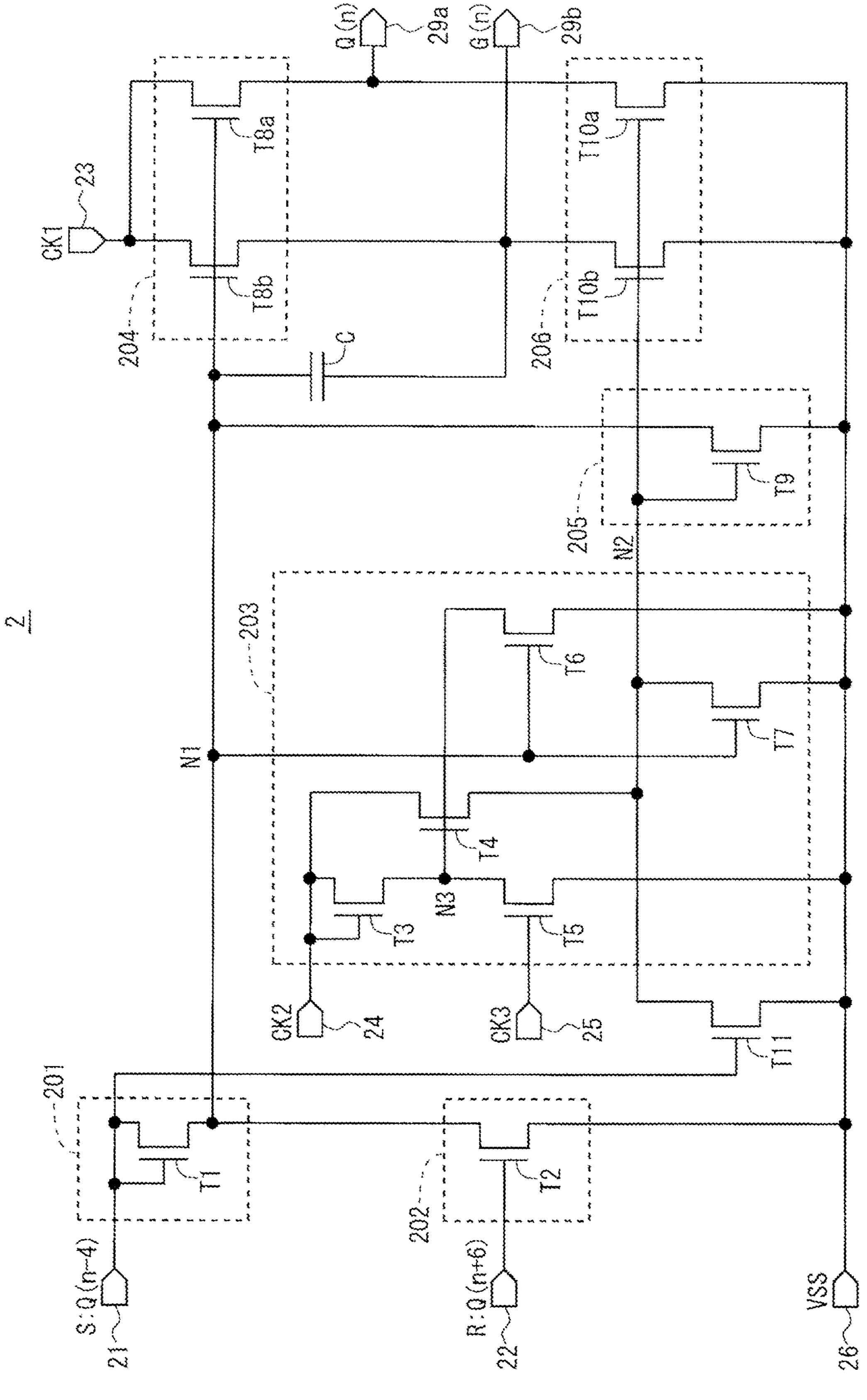
FIG. 19 is a circuit diagram illustrating a configuration of a unit circuit (configuration of one stage of a shift register) in a sixth modified example of the embodiment.

FIG. 19 is a circuit diagram illustrating a configuration of the unit circuit 2 according to the present modified example. Note that a configuration is illustrated here in which the output terminal 29 in the configuration of the third modified example (see FIG. 14) is separated into two output terminals 29*a* and 29*b*, but the configuration is not limited thereto.

As illustrated in FIG. 19, the unit circuit 2 according to the present modified example includes the two output terminals 29*a* and 29*b*. Correspondingly, the output control unit 204 includes two thin film transistors T8*a* and T8*b*, and the output pull-down unit 206 includes two thin film transistors T10*a* and T10*b*. The other configurations are similar to those of the third modified example.

Figure 20:
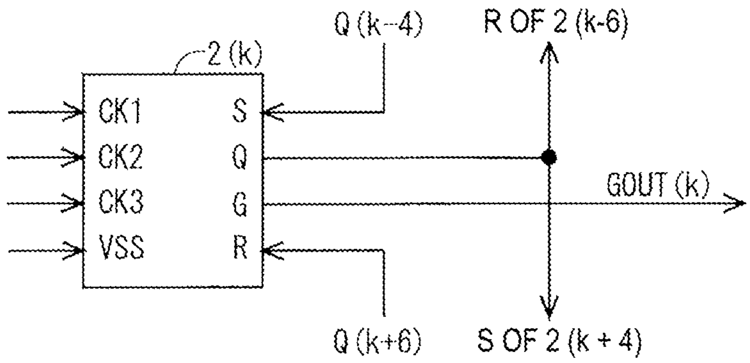
FIG. 20 is a diagram for describing input/output signals of the unit circuit in the sixth modified example of the embodiment.

The output signal Q(n) is output from the output terminal 29*a* and the output signal G(n) is output from the output terminal 29*b*. The output signal Q(n) is applied as the other-stage control signal to a unit circuit 2 constituting another stage. Specifically, the output signal Q(n) output from the output terminal 29*a* of the unit circuit 2(*n*) at the n-th stage is applied as the reset signal R to the unit circuit 2 (n−6) at the (n−6)-th stage, and is applied as the set signal S to the unit circuit 2(*n*+4) at the (n+4)-th stage. The output signal G(n) is applied as the scanning signal GOUT (n) to the corresponding gate bus line GL (n). As described above, in the present modified example, the input/output signals of each unit circuit 2 are as illustrated in FIG. 20. Note that, in FIG. 20, similarly to FIG. 7, the unit circuit 2 (*k*) at the k-th stage is focused on, where k is an integer of 1 or more and i or less.

As for the thin film transistor T8*a*, a control terminal thereof is connected to the first node N1, a first conduction terminal thereof is connected to the input terminal 23, and a second conduction terminal thereof is connected to the output terminal 29*a*. As for the thin film transistor T8*b*, a control terminal thereof is connected to the first node N1, a first conduction terminal thereof is connected to the input terminal 23, and a second conduction terminal thereof is connected to the output terminal 29*b*. As described above, the first conduction terminal of the thin film transistor T8*a* and the first conduction terminal of the thin film transistor T8*b* are applied with the first clock signal CK1 which is the same clock signal. As for the thin film transistor T10*a*, a control terminal thereof is connected to the second node N2, a first conduction terminal thereof is connected to the output terminal 29*a*, and a second conduction terminal thereof is connected to the input terminal 26. As for the thin film transistor T10*b*, a control terminal thereof is connected to the second node N2, a first conduction terminal thereof is connected to the output terminal 29*b*, and a second conduction terminal thereof is connected to the input terminal 26.

Note that, in the present modified example, a first output node is achieved by the output terminal 29*a*, a second output node is achieved by the output terminal 29*b*, a first output control transistor is achieved by the thin film transistor T8*b*, and a second output control transistor is achieved by the thin film transistor T8*a*.

Figure 21:
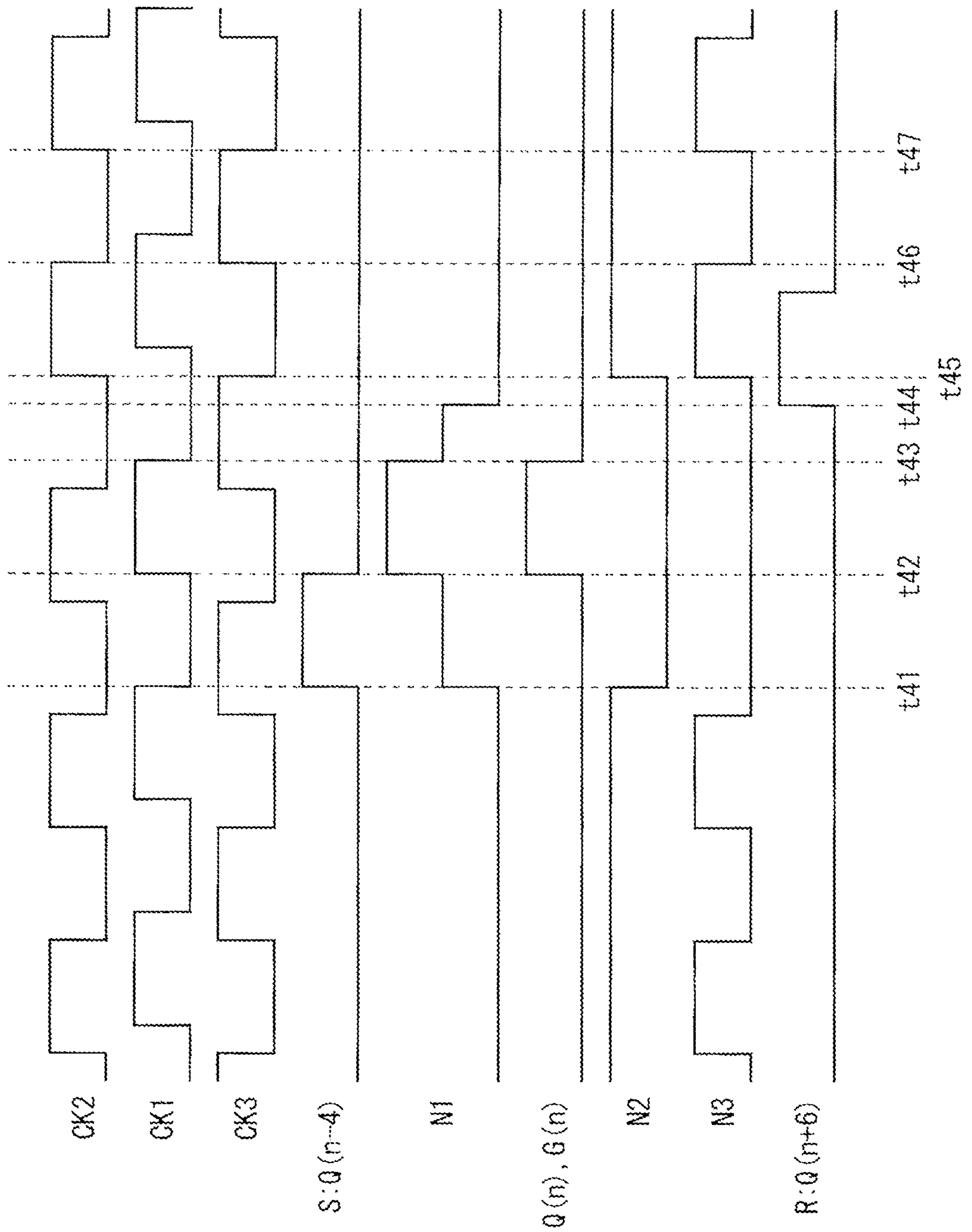
FIG. 21 is waveform diagrams for describing operations of the unit circuit in the sixth modified example of the embodiment.
Figure 22:
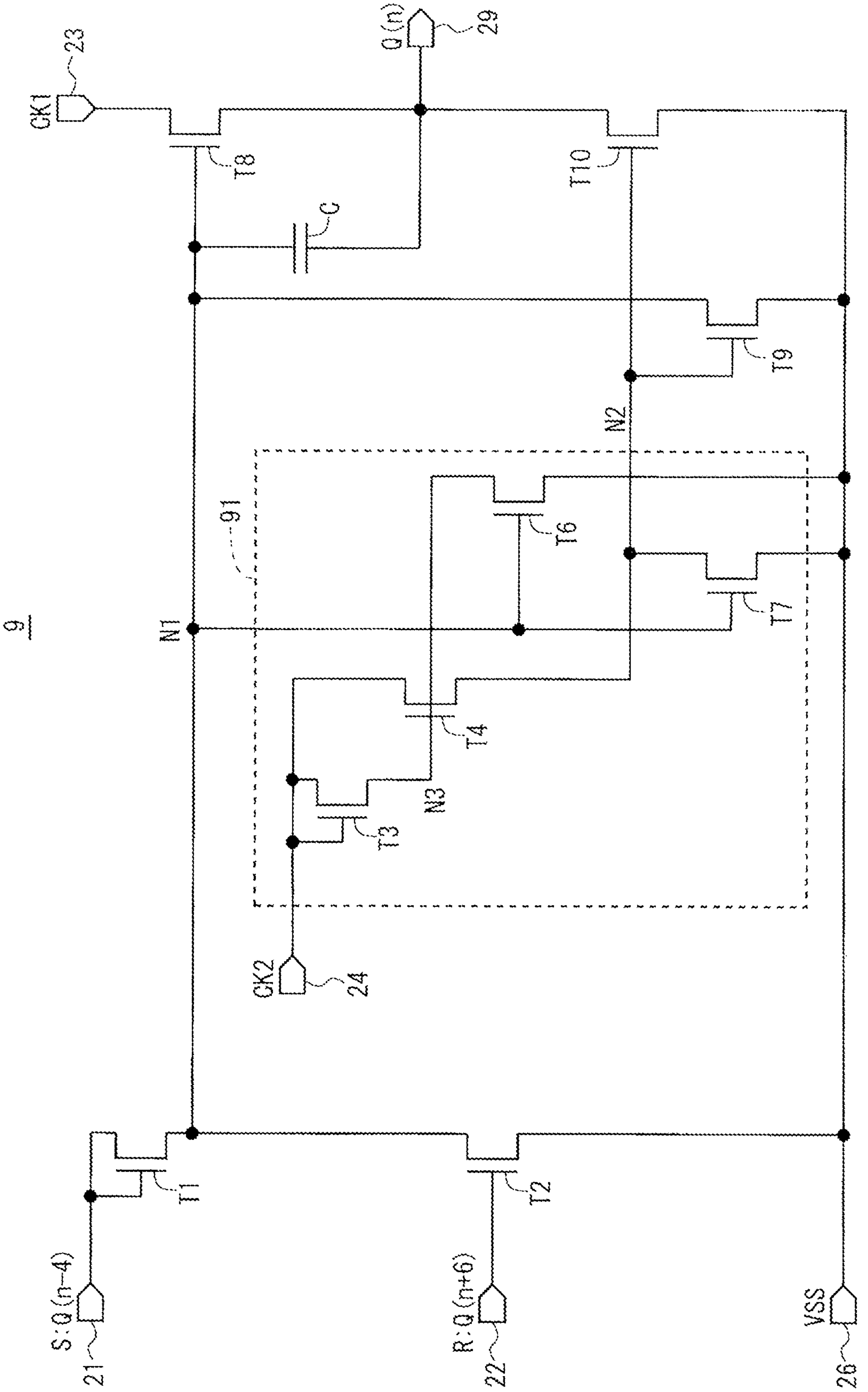
FIG. 22 is a circuit diagram illustrating a configuration of a unit circuit (configuration of one stage of a shift register) in a known example.
Figure 23:
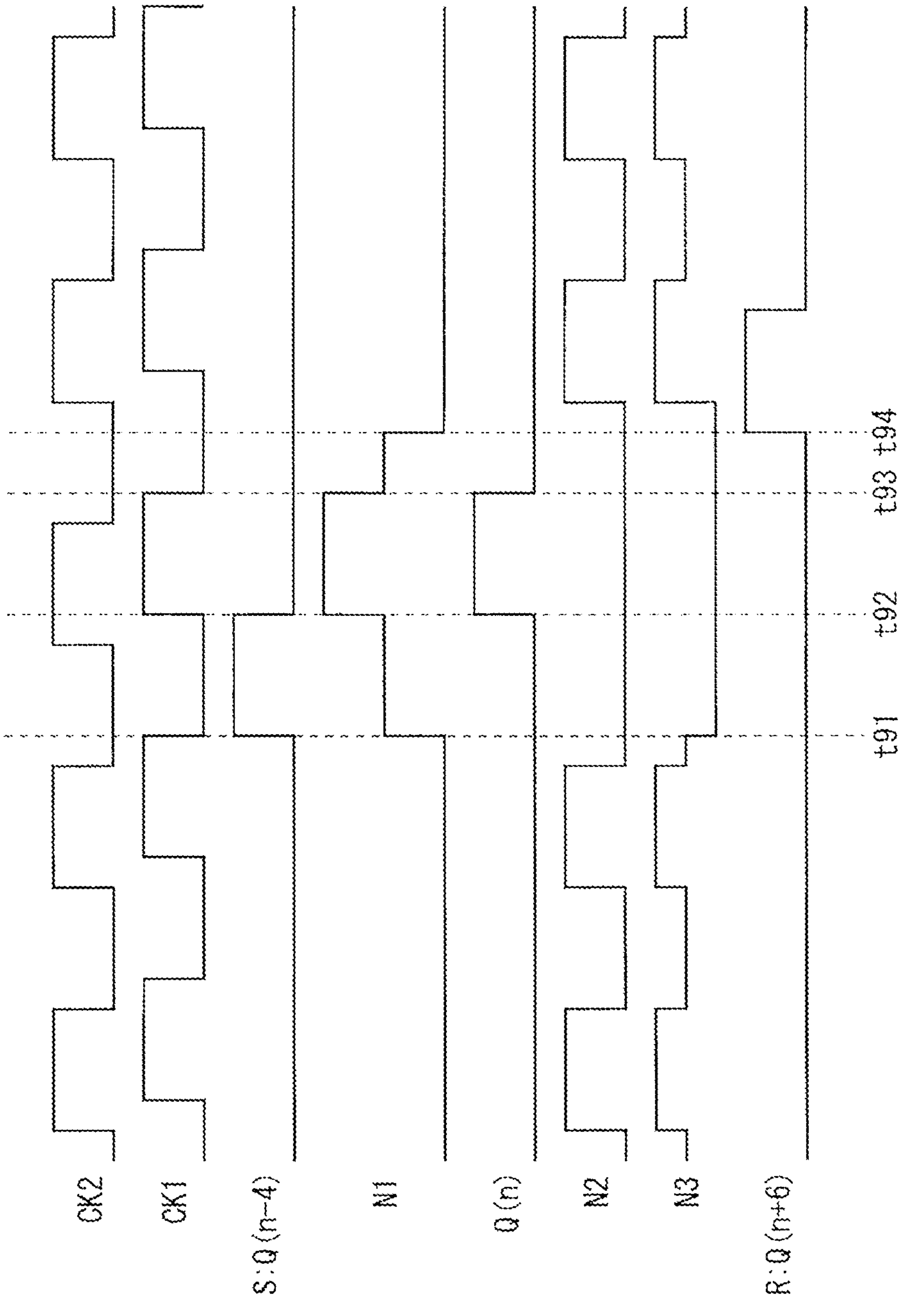
FIG. 23 is waveform diagrams for describing operations of the unit circuit in the known example.

Operations of the unit circuit 2 according to the present modified example will be described with reference to FIG. 21. Note that, also here, the unit circuit 2 (*n*) at the n-th stage is focused on.

At time immediately before time t41, the set signal S is at the low level, the output signals Q(n) and G(n) are at the low level, the reset signal R is at the low level, the potential of the first node N1 is at the low level, the potential of the second node N2 is at the high level, and the potential of the third node N3 is at the low level.

At the time t41, the set signal S changes from the low level to the high level. As a result, similarly to the time t1*l* in the above embodiment, the potential of the first node N1 rises. As a result, the thin film transistors T6, T7, T8*a*, T8*b*, and T1*l* are set to be in the on state. By setting the thin film transistors T7 and T1*l* to be in the on state, the potential of the second node N2 is set to be at the low level. Note that, in the period from the time t41 to time t42, the first clock signal CK1 is at the low level, and thus, even when the thin film transistors T8*a* and T8*b* are in the on state, the output signals Q(n) and G(n) are maintained at the low level. Similarly to the period from time t1*l* to the time t14 in the above embodiment, the potential of the third node N3 and the potential of the second node N2 are maintained at the low level in the period from the time t41 to time t44.

At the time t42, the first clock signal CK1 changes from the low level to the high level. At this time, since the thin film transistors T8*a* and T8*b* are in the on state, the potentials of the output terminals 29*a* and 29*b* rise along with the rise of the potential of the input terminal 23. Here, since the capacitor C is provided between the first node N1 and the output terminal 29*b* as illustrated in FIG. 1, the potential of the first node N1 also rises along with the rise of the potential of the output terminal 29*b* (the first node N1 is set to be in the boost state). As a result, a large voltage is applied to the control terminal of the thin film transistor T8*b*, and the potential of the output signal G(n) rises up to a level sufficient to cause the gate bus line GL(n) connected to the output terminal 29*b* to be in a select state. Similarly, the potential of the output signal Q(n) also rises. Note that, in the period from the time t42 to time t43, the reset signal R is maintained at the low level, and the potential of the second node N2 is also maintained at the low level. Thus, during this period, the thin film transistor T2 and the thin film transistors T10*a* and T10*b* are maintained in the off state, so that the potential of the first node N1 and the potentials of the output signals Q(n) and G(n) (the potentials of the output terminals 29*a* and 29*b*) do not fall.

At the time t43, the first clock signal CK1 changes from the high level to the low level. As a result, the potentials of the output terminals 29*a* and 29*b* falls along with fall of the potential of the input terminal 23. That is, the potentials of the output signals Q(n) and G(n) are set to be at the low level. The potential of the first node N1 falls via the capacitor C.

At the time t44, the reset signal R changes from the low level to the high level. As a result, the thin film transistor T2 is set to be in the on state, and the potential of the first node N1 is set to be at the low level. By setting the potential of the first node N1 to be at the low level, the thin film transistors T6, T7, T8*a*, T8*b*, and T1*l* are set to be in the off state.

At time t45, similarly to the time t15 in the above embodiment, the potential of the third node N3 and the potential of the second node N2 change from the low level to the high level. In a period after the time t46, operations similar to those in the period after the time t16 in the above embodiment are performed.

Also in the present modified example, in the non-select period, the potential of the third node N3 repeats the change from the low level to the high level and the change from the high level to the low level, and the potential of the second node N2 is maintained at the high level. As a result, throughout the non-select period, the potential of the first node N1 and the potential of the output signals Q(n) and G(n) (the potentials of the output terminals 29*a* and 29*b*) are maintained at the low level.

According to the present modified example, the two thin film transistors T8*a* and T8*b* are included in the output control unit 204 in the unit circuit 2 (see FIG. 19), the other-stage control signal is output from the output terminal 29*a* connected to the second conduction terminal of the thin film transistor T8*a*, and the scanning signal GOUT is output from the output terminal 29*b* connected to the second conduction terminal of the thin film transistor T8*b*. Since such a configuration is adopted, even when load capacitance of the gate bus line GL is large, waveform rounding of the other-stage control signal (the set signal S and the reset signal R) can be reduced. As described above, with respect to the shift register 210, the circuit operation can be sped up and the reliability of the circuit operation is improved.

5. Other

Although the disclosure has been described in detail above, the above description is exemplary in all respects and is not limited thereto. It is understood that numerous other modifications or variations can be made without departing from the scope of the disclosure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A scanning signal line drive circuit configured to drive a plurality of scanning signal lines, the scanning signal line drive circuit comprising:

a shift register configured to operate based on a plurality of clock signals and including a plurality of stages corresponding to the plurality of scanning signal lines on a one-to-one basis, wherein a unit circuit constituting each of the plurality of stages included in the shift register includes a first node, a second node, a third node, a first output node configured to output an output signal to a corresponding one of the plurality of scanning signal lines, a first output control transistor including a control terminal connected to the first node, a first conduction terminal applied with one of the plurality of clock signals, and a second conduction terminal connected to the first output node, a first node pull-up unit configured to change a potential of the first node toward an on level, based on a set signal, a first node pull-down unit configured to change the potential of the first node toward an off level, based on a reset signal, a stabilization transistor including a control terminal connected to the second node, a first conduction terminal connected to the first node or the first output node, and a second conduction terminal applied with an off level potential, and a stabilization circuit connected to the second node, the stabilization circuit includes a second node pull-up transistor including a control terminal connected to the third node, a first conduction terminal applied with one of the plurality of clock signals, and a second conduction terminal connected to the second node, a first second node pull-down transistor including a control terminal connected to the first node, a first conduction terminal connected to the second node, and a second conduction terminal applied with an off level potential, a first third node pull-down transistor including a control terminal connected to the first node, a first conduction terminal connected to the third node, and a second conduction terminal applied with an off level potential, a third node pull-up transistor including a control terminal and a first conduction terminal that are applied with one of the plurality of clock signals and including a second conduction terminal connected to the third node, and a second third node pull-down transistor including a control terminal applied with one of the plurality of clock signals, a first conduction terminal connected to the third node, and a second conduction terminal applied with an off level potential, and a clock signal applied to the control terminal of the second third node pull-down transistor changes from the off level to the on level at a timing when a clock signal applied to the control terminal of the third node pull-up transistor changes from the on level to the off level.

2. The scanning signal line drive circuit according to claim 1, wherein the set signal is an output signal output from a first output node of a unit circuit constituting a stage before a present stage, and the reset signal is an output signal output from a first output node of a unit circuit constituting a stage after the present stage.

3. The scanning signal line drive circuit according to claim 1, wherein the unit circuit includes a second output node configured to output an other-stage control signal configured to control operations of a unit circuit constituting a stage before a present stage and a unit circuit constituting a stage after the present stage, and a second output control transistor including a control terminal connected to the first node, a first conduction terminal applied with one of the plurality of clock signals, and a second conduction terminal connected to the second output node, a clock signal applied to the first conduction terminal of the first output control transistor and a clock signal applied to the first conduction terminal of the second output control transistor are the same clock signal, the set signal is an other-stage control signal output from a second output node of a unit circuit constituting a stage before the present stage, and the reset signal is an other-stage control signal output from a second output node of a unit circuit constituting a stage after the present stage.

4. The scanning signal line drive circuit according to claim 1, wherein the first node pull-up unit includes a first node pull-up transistor, the first node pull-up transistor including a control terminal and a first conduction terminal that are applied with the set signal and including a second conduction terminal connected to the first node.

5. The scanning signal line drive circuit according to claim 1, wherein the first node pull-down unit includes a first first node pull-down transistor, the first first node pull-down transistor including a control terminal applied with the reset signal, a first conduction terminal connected to the first node, and a second conduction terminal applied with an off level potential.

6. The scanning signal line drive circuit according to claim 1, wherein the unit circuit includes, as the stabilization transistor, a second first node pull-down transistor including a first conduction terminal connected to the first node.

7. The scanning signal line drive circuit according to claim 1, wherein the unit circuit includes, as the stabilization transistor, a first output node pull-down transistor including a first conduction terminal connected to the first output node.

8. The scanning signal line drive circuit according to claim 1, wherein the unit circuit includes, as the stabilization transistor, a second first node pull-down transistor including a first conduction terminal connected to the first node and a first output node pull-down transistor including a first conduction terminal connected to the first output node.

9. The scanning signal line drive circuit according to claim 1, wherein the unit circuit includes a second second node pull-down transistor, the second second node pull-down transistor including a control terminal applied with the set signal, a first conduction terminal connected to the second node, and a second conduction terminal applied with an off level potential.

10. The scanning signal line drive circuit according to claim 1, wherein the plurality of clock signals are P-phase clock signals with P being a natural number, and a phase of a clock signal applied to the control terminal of the third node pull-up transistor is advanced by (360/P) degrees from a phase of a clock signal applied to the first conduction terminal of the first output control transistor.

11. The scanning signal line drive circuit according to claim 1, wherein a clock signal applied to the control terminal of the third node pull-up transistor and a clock signal applied to the first conduction terminal of the first output control transistor are the same clock signal.

12. The scanning signal line drive circuit according to claim 1, wherein a channel length of the third node pull-up transistor is longer than a channel length of any of the first output control transistor, the stabilization transistor, the second node pull-up transistor, the first second node pull-down transistor, the first third node pull-down transistor, and the second third node pull-down transistor.

13. A scanning signal line drive circuit configured to drive a plurality of scanning signal lines, the scanning signal line drive circuit comprising:

a shift register configured to operate based on a plurality of clock signals and including a plurality of stages corresponding to the plurality of scanning signal lines on a one-to-one basis, wherein a unit circuit constituting each of the plurality of stages included in the shift register includes a first node, a second node, a third node, a first output node configured to output an output signal to a corresponding one of the plurality of scanning signal lines, a first output control transistor including a control terminal connected to the first node, a first conduction terminal applied with one of the plurality of clock signals, and a second conduction terminal connected to the first output node, a first node pull-up unit configured to change a potential of the first node toward an on level, based on a set signal, a first node pull-down unit configured to change a potential of the first node toward an off level, based on a reset signal, a stabilization transistor including a control terminal connected to the second node, a first conduction terminal connected to the first node or the first output node, and a second conduction terminal applied with an off level potential, and a stabilization circuit connected to the second node, the stabilization circuit includes a second node pull-up transistor including a control terminal connected to the third node, a first conduction terminal applied with one of the plurality of clock signals, and a second conduction terminal connected to the second node, a second node pull-down transistor including a control terminal connected to the first node, a first conduction terminal connected to the second node, and a second conduction terminal applied with an off level potential, a first third node pull-down transistor including a control terminal connected to the first node, a first conduction terminal connected to the third node, and a second conduction terminal applied with an off level potential, a third node pull-up transistor including a control terminal and a first conduction terminal that are applied with one of the plurality of clock signals and including a second conduction terminal connected to the third node, and a second third node pull-down transistor including a control terminal and a first conduction terminal that are connected to the third node and including a second conduction terminal applied with one of the plurality of clock signals, and a clock signal applied to the control terminal of the third node pull-up transistor and a clock signal applied to the second conduction terminal of the second third node pull-down transistor are the same clock signal.

14. The scanning signal line drive circuit according to claim 13, wherein the set signal is an output signal output from a first output node of a unit circuit constituting a stage before a present stage, and the reset signal is an output signal output from a first output node of a unit circuit constituting a stage after the present stage.

15. The scanning signal line drive circuit according to claim 13, wherein the unit circuit includes a second output node configured to output an other-stage control signal configured to control operations of a unit circuit constituting a stage before a present stage and a unit circuit constituting a stage after the present stage, and a second output control transistor including a control terminal connected to the first node, a first conduction terminal applied with one of the plurality of clock signals, and a second conduction terminal connected to the second output node, a clock signal applied to the first conduction terminal of the first output control transistor and a clock signal applied to the first conduction terminal of the second output control transistor are the same clock signal, the set signal is an other-stage control signal output from a second output node of a unit circuit constituting a stage before the present stage, and the reset signal is an other-stage control signal output from a second output node of a unit circuit constituting a stage after the present stage.

16. A display device comprising:

a substrate;

a plurality of image signal lines formed on the substrate;

a plurality of scanning signal lines formed on the substrate and intersecting the plurality of image signal lines;

a plurality of pixel forming sections formed on the substrate, each of the plurality of pixel forming sections corresponding to a respective one of intersections of the plurality of image signal lines and the plurality of scanning signal lines;

an image signal line drive circuit configured to drive the plurality of image signal lines; and the scanning signal line drive circuit according to claim 1 formed on the substrate and configured to drive the plurality of scanning signal lines.

17. The display device according to claim 16, wherein a region on the substrate includes a display region with the plurality of pixel forming sections formed, a shift register region with the shift register formed, and a main wiring line region with a plurality of clock signal main wiring lines formed, the plurality of clock signal main wiring lines configured to transmit the plurality of clock signals, the shift register region is provided between the display region and the main wiring line region, and each unit circuit is provided with a clock signal branch wiring line including one end connected to one of the plurality of clock signal main wiring lines and the other end connected to the control terminal of the second third node pull-down transistor.

18. The display device according to claim 17, wherein each of the plurality of image signal lines is formed of a first metal film, the plurality of scanning signal lines are formed of a second metal film, the plurality of clock signal main wiring lines are formed of the first metal film, the clock signal branch wiring line are formed of the second metal film, and the clock signal branch wiring line is connected to one of the plurality of clock signal main wiring lines via a contact hole in the main wiring line region.

19. The display device according to claim 16, wherein a region on the substrate includes a display region with the plurality of pixel forming sections formed, a shift register region with the shift register formed, and a main wiring line region with a plurality of clock signal main wiring lines formed, the plurality of clock signal main wiring lines configured to transmit the plurality of clock signals, the shift register region is provided between the display region and the main wiring line region, and the first conduction terminal of the first output control transistor included in a unit circuit at an (n−1)-th stage and the control terminal and the first conduction terminal of the third node pull-up transistor included in a unit circuit at an n-th stage are connected to the same clock signal branch wiring line including one end connected to one of the plurality of clock signal main wiring lines, with n being a natural number.

* * * * *